US008174733B2

(12) United States Patent
Kobayashi

(10) Patent No.: US 8,174,733 B2
(45) Date of Patent: *May 8, 2012

(54) TINT BLOCK IMAGE GENERATION PROGRAM AND TINT BLOCK IMAGE GENERATION DEVICE

(75) Inventor: Makoto Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 890 days.

This patent is subject to a terminal disclaimer.

(21) Appl. No.: 12/132,566

(22) Filed: Jun. 3, 2008

(65) Prior Publication Data

US 2009/0315907 A1    Dec. 24, 2009

(30) Foreign Application Priority Data

Jun. 6, 2007  (JP) .................................. 2007-150575
May 7, 2008  (JP) .................................. 2008-121066

(51) Int. Cl.
    *H04N 1/405*    (2006.01)
(52) U.S. Cl. ........................ 358/3.28; 358/3.12; 358/3.1
(58) Field of Classification Search ................. 358/3.28, 358/3.1–3.12, 1.9, 2.1, 3.14, 3.16, 3.2, 3.3
    See application file for complete search history.

(56) References Cited

U.S. PATENT DOCUMENTS

| 4,296,197 A * | 10/1981 | Stevie ........................... 430/300 |
| 2005/0174596 A1* | 8/2005 | Uchida et al. ................. 358/1.14 |
| 2007/0127056 A1* | 6/2007 | Hirano et al. ................. 358/1.14 |

FOREIGN PATENT DOCUMENTS

| JP | 2005-151456 | 6/2005 |
| JP | 2009-135961 A | 6/2009 |

* cited by examiner

*Primary Examiner* — Thomas D Lee
*Assistant Examiner* — Stephen M Brinich
(74) *Attorney, Agent, or Firm* — DLA Piper LLP (US)

(57) ABSTRACT

A tint block image generation program generates tint block image data which forms a tint block image including a latent image portion, which is reproduced during copying, and a background portion, of which output density drops during copying, on a print medium. The program causing a computer to execute: a latent image portion generation step of generating data of a plurality of first dots on the latent image portion; and a background portion generation step of generating data of a plurality of second dots having a second screen ruling, and data of a plurality of third dots which are dispersed among the second dots, and of which size is smaller than that of the second dots, in the background portion.

21 Claims, 18 Drawing Sheets

FIG.6

FIG.10
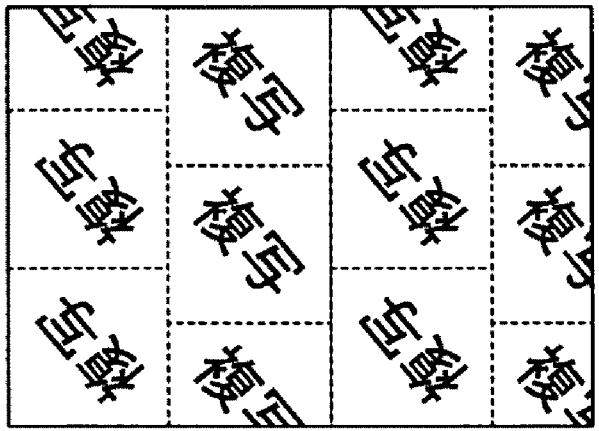
(c) INVERTED ARRANGEMENT
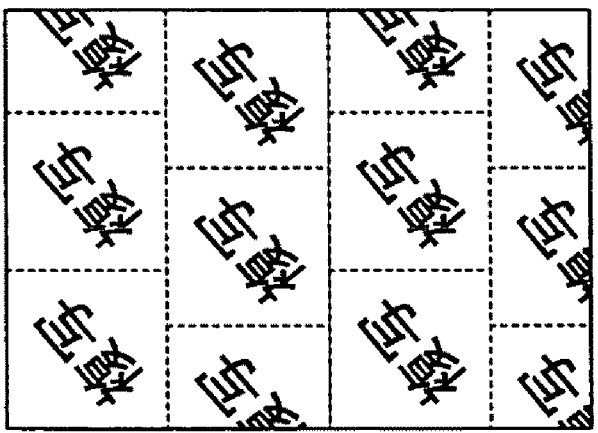
(b) OBLIQUE ARRANGEMENT
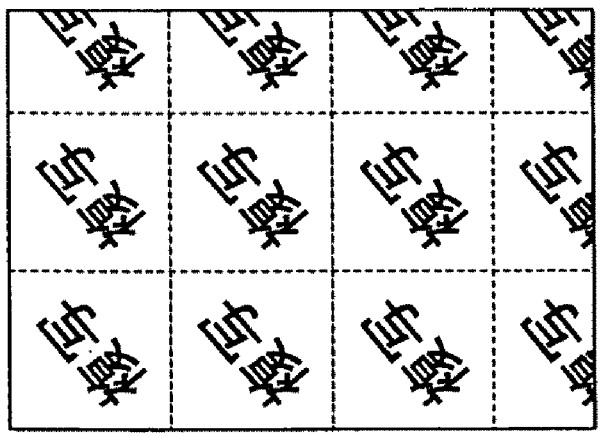
(a) SQUARED ARRANGEMENT

TINT BLOCK IMAGE GENERATION PROGRAM AND TINT BLOCK IMAGE GENERATION DEVICE

CROSS-REFERENCE TO RELATED APPLICATIONS

This application is based upon and claims the benefit of priority from the prior Japanese Patent Applications No. 2007-150575, filed on Jun. 6, 2007, and No. 2008-121066, filed on May 7, 2008, the entire contents of which are incorporated herein by reference.

BACKGROUND OF THE INVENTION

1. Field of the Invention

The present invention relates to a tint block image generation program and a tint block image generation device, and more particularly to a program and device for generating tint block image data to be printed on a print medium. The present invention also relates to a tint block image generation program and generation device which has an effect to inhibit forgery by copying a print medium (original) on which a tint block image is printed based on the tint block data or an effect to distinguish between the original and the copy.

2. Description of the Related Art

The forgery inhibited tint block is combined with the original image as background, and allows distinguishing whether the print document is the original or the copy. Characters or images in the forgery inhibited tint block can hardly be identified in the original, but if copied, the characters or images in the tint block emerge. Using this, the original and the copy can easily be distinguished. Also the characters or images in the tint block emerge in copying, so if an original is generated combining with the forgery inhibited tint block, an attempt to copy the original is psychologically discouraged.

The forgery inhibited tint block is disclosed in Japanese Patent Application Laid-Open No. 2005-151456, and details follow according to this description.

Generally a forgery inhibited tint block is comprised of two areas: a "latent image portion" where dots printed in the original remain or decrease little by copying, and a "background portion" where dots printed in the original are lost or greatly decreased by copying. In other words, in the latent image portion, density changes little by copying, and the original image is reproduced as is, and in the background portion, density changes considerably by copying, and the original image disappears. The characters or images of the tint block are generated by these two areas, and the characters and images of the tint block are called the "latent image".

The densities of the latent image portion and the background portion are roughly the same, and in the original state, it is visually difficult to find such characters or images as "COPIED" of Japanese character are concealed in the tint block, but at the micro level, the background portion and latent image portion have different characteristics. When the tint block is copied, a density difference is generated between the latent image portion and the background portion, because of the difference of the respective change of density, which makes it easier to discern the characters or images of the tint block created by these two areas.

The latent image portion is comprised of clustered dots where individual dots cluster so that dots can be easily read when copying (scanning by copying), whereas the background portion is comprised of dispersed dots so that dots cannot be easily read when copying. By this, dots tend to remain in the latent image after copying, and dots tend to disappear in the background portion more easily than the latent image portion. Clustered dots or dispersed dots can be implemented by half tone processing using a different number of lines of half tone dots. In other words, half tone dots of which screen ruling is low are used to obtain a clustered dot arrangement, and half tone dots of which screen ruling is high are used to obtain a dispersed lot arrangement.

Generally a copier has a limitation in image reproducing capability, which depends on the input resolution in a step of reading the micro dots of a copy target original by a scanner, and the output resolution in a step of reproducing micro dots, read by the scanner, using a print engine. Therefore if isolated micro dots exist in the original, exceeding the limitation of the image reproducing capability of the copier, the micro dots cannot be perfectly reproduced in a copy, and the portions of the isolated micro dots disappear. In other words, if the background portion of the forgery inhibited tint block is created so as to exceed the limitation of the dots that the copier can reproduce, then large dots (clustered dots) in the forgery inhibited tint block can be reproduced by copying, but small dots (dispersed dots) cannot be reproduced by copying, and a concealed latent image appears in the copy. Even if the dispersed dots in the background portion do not disappear completely by copying, a density difference is generated between the background portion and the latent image portion after copying if the degree of loss of dots is high, compared with the clustered dots in the latent image portion, then a concealed latent image appears in the copy.

In the forgery inhibited tint block, a technology called "camouflage" is used to make it more difficult to discern characters or images concealed as a latent image. This camouflage technology is a method for arranging patterns, of which density is different from the latent image portion and the background portion, in the entire forgery inhibited tint block image, and in a macro view, the camouflage patterns, of which density is different from the latent image portion and the background portion, standout, making the latent image even more obscure. In other words, the contrast of the camouflage patterns is high, and the contrast of the latent image portion and the background portion is smaller than this, so the latent image is more effectively concealed because of optical illusion. Also the camouflage pattern can give a decorative impression on printed matter, and allows creating an artistically designed forgery inhibited tint block. Generally a camouflage pattern is created in binary, and the camouflage pattern is formed by not generating dots of the tint block in an area corresponding to the camouflage pattern. The above is an overview of the forgery inhibited tint block.

FIG. 1 shows an example of a latent image of a forgery inhibited tint block and a camouflage pattern. In a latent image mask pattern 10 of the Japanese character "COPY", the black portion corresponds to the latent image portion LI of the tint block, and the white portion corresponds to the background portion BI of the tint block, for example, as the enlarged view 10X shows. In the camouflage pattern 12, on the other hand, the black portion CAM becomes an area where the dots of the tint block are not formed, and the white portion becomes an area where dots of the tint block are formed, for example, as the enlarged view 12X shows. In other words, the data of the camouflage pattern is binary image data where each pixel indicates a portion to print the tint block image and a portion not to be printed.

FIG. 2 is a diagram depicting an example of an original in which a forgery inhibited tint block is printed. In the tint block 14, a latent image portion LI and a background portion BI are formed based on the latent image mask pattern 10 in FIG. 1. The latent image portion LI is formed by dots with low screen ruling (53 lpi) based on a clustered dot dither method, and the background portion BI is formed of dots with high screen ruling (212 lpi) based on the dispersed dot dither method. As the enlarged tint block 14X shows, the entire tint block has a predetermined output density, but the dots in the latent image portion LI are large dots formed by a screen with low screen ruling, and the dots in the background portion BI are small dots formed by a screen with high screen ruling.

In the tint block 16, the latent image portion LI and the background portion BI are formed, excluding a black area CAM of the camouflage pattern, based on the latent image mask pattern 10 and the camouflage pattern 12 in FIG. 1. As the enlarged tint block 16X shows, the entire tint block has a predetermined output density, where dots are not formed in the area CAM of the camouflage pattern, and in another area, the latent image portion LI formed by large dots and the background portion BI formed by micro dots are formed just like FIG. 1. Since the contrast of the camouflage pattern is high, the latent image (the Japanese character "COPY"), comprised of the latent image portion LI and the background portion BI, of which contrast is low, does not stand out.

In the original of the forgery inhibited tint block in FIG. 2, the output density of the latent image portion LI and the background portion BI are the same, whereby the latent image of the Japanese character "COPY" formed by these portions is concealed. This is referred to as the "concealment capability for a latent image in the original is high".

FIG. 3 is a diagram depicting an example of a copy of the forgery inhibited tint block. The copy 18 is created via a scanning step and dot generation step (step of printing the print media based on the scan data generated in the scanning step) by copying, and as the enlarged view 18X shows, large dots in the latent image portion LI are hardly lost, but many micro dots in the background portion BI are lost. As a result, in the copy 18, the output density of the latent image LI hardly drop, but the output density of the background portion BI drop considerably, and the latent image of the Japanese character "COPY" emerges. In other words, the latent image of the copy is more easily identified.

The copy 20 is the same as the copy 18, except for the area CAM of the camouflage pattern. The contrast of the camouflage pattern drops because of the drop in the output density of the background portion BI, and the latent image COPY emerges.

As mentioned above, increasing the concealment capability for the latent image in the original and increasing the identification capability for a latent image in the copy are demanded for tint blocks. However, if the latent image portion of the tint block is formed by dots with low screen ruling using a clustered dot screen and the background portion is formed by dots with high screen ruling using a dispersed dot screen, as in the case of the prior art, a high concealment capability for the latent image in the original and a high identification capability for the latent image in the copy cannot be implemented.

In order to increase the identification effect of the latent image in the copy so as to increase the copy inhibition effect, increasing the output density for the latent image portion is desirable. This is because the identification capability for the latent image increases if the output density of the latent image portion which emerges in the copy increases, as shown in FIG. 3, and the copy inhibition effect increases.

However, if the output density is increased by further increasing the size of the large dots in the latent image portion, the output density of the background portion must also be increased in order to maintain the concealment capability for the latent image in the original. This is because the concealment capability for the latent image in the original is increased by making the output density of the latent image portion and the output density of the background portion the same or similar. Increasing the output density of the background portion using a conventional configuration, however, has the following problems.

First the background portion is comprised of micro dots dispersed by the dot dispersed screen, so in order to increase the output density of the background portion, the density of the micro dots must be increased by increasing the screen ruling. However the screen ruling of the background portion has a certain limitation due to the limitation of the dot reproducing capability of the printer engine, so if the screen ruling is increased beyond the limitation, dispersed dots can no longer be reproduced. In other words, in actual printed matter, the dots which were supposed to be disposed influence each other and combine, and can no longer exist as micro dots. As a result, the dots in the background portion do not disappear in the copying step, and the output density difference cannot be generated between the latent image portion and the background portion, and the identification capability in the copy drops.

Secondly, an attempt to implement the concealment capability of a latent image in the original by equalizing the output density of the background portion with that of the latent image portion, by increasing the screen ruling of the background portion to increase the density of micro dots, does not work due to the following reason. In the background portion having high screen ruling, which sensitively responds to the characteristics of the printer engine, a density unevenness in the background portion clearly appears, but in the latent image portion with low screen ruling, which is not influenced very much by the characteristics of the printer engine, the density unevenness is hardly generated.

FIG. 4 shows a tint block which has a density unevenness in the background portion, and a tint block which has a difference in hue and saturation between the background portion and the latent image portion. In FIG. 4, the tint block 22 has an area where the latent image stands out and an area where the latent image does not stand out, which coexist in the background portion, because of the above mentioned density unevenness that is generated in the background portion. The tint block 22E is the tint block 22 which is artificially exaggerated.

In the case of the forgery inhibited tint block formed by high brightness color toner, such as cyan or magenta, the difference in hue and saturation between the latent image portion and background portion further increases because of the large difference in screen rulings, and the latent image tends to stand out throughout the tint block. The tint block 24 in FIG. 4 is an example when the difference in hue and saturation increased, and the latent image stood out. The tint block 24E is the tint block 24 which is artificially exaggerated. The difference in hue and saturation between the background portion and latent image portion increased, and the latent image of the characters "COPIED" stands out.

Therefore the second problem is that an attempt to increase the output density by increasing the screen ruling of the background portion formed by micro dots fails, and rather diminishes the concealment capability on the latent image in the original, because of the high screen ruling of the background portion and the major difference of the screen ruling between the latent image portion and the background portion.

SUMMARY OF THE INVENTION

With the foregoing in view, it is an object of the present invention to provide a method to generate a tint block which can increase the identification capability for the latent image in the copy by increasing the output density of the latent image in the copy, while maintaining the concealment capability on the latent image in the original, a program to generate the tint block data, recording media storing this program, and a device for generating the tint block.

To achieve the above object, a first aspect of the present invention provides a computer readable medium which stores a tint block image generation program for generating tint block image data which forms a tint block image including a latent image portion, which is reproduced during copying, and a background portion, of which output density drops during copying, on a print medium, the program causing a computer to execute: a latent image portion generation step of generating data of a plurality of first dots on the latent image portion; and a background portion generation step of generating data of a plurality of second dots having a second screen ruling, and data of a plurality of third dots which are dispersed among the second dots, and of which size is smaller than that of the second dots, in the background portion.

In the first aspect, it is preferable that the latent image portion generation step generates the data of the plurality of first dots having a first screen ruling based on a dot clustered screen, and the second screen ruling has the number of lines equivalent to the first screen ruling. It is more preferable that the second screen ruling is greater than the first screen ruling and less than double the first screen ruling.

In the first aspect, it is preferable that the computer executes a density setting step of, in responding to a density setting input for a tint block image, selecting the second screen ruling corresponding to the density setting input, and the latent image portion generation step generates data of the first dots of which size corresponds to the second screen ruling is selected in the density setting step, based on a dot clustered screen.

In the first aspect, it is preferable that the background portion generation step generates background portion dot image data in which the plurality of second dots and the plurality of third dots are placed at fixed positions in the background portion, and uses a dot image data having the second screen ruling selected corresponding to the density setting input for the tint block as the background portion dot image data, out of a plurality of types of dot image data having a plurality of second screen rulings respectively.

It is preferable that the latent image portion generation step generates the data of the first dots having a size which allows to reproduce the same output density as the dot image having the selected second screen ruling, based on a dot clustered screen.

To achieve the above object, a second aspect of the present invention provides a tint block image generation device for generating a tint block image including a latent image portion, which is reproduced during copying, and a background portion, of which output density drops during copying, on a print medium, having: a latent image portion generation unit, which generates a plurality of first dots in the latent image portion; and a background portion generation unit, which generates a plurality of second dots having a second screen ruling, and a plurality of third dots which are dispersed among the second dots and of which size is smaller than that of the second dots, in the background portion.

In the second aspect, it is preferable that the latent image portion generation unit generates the plurality of first dots having a first screen ruling based on a dot clustered screen, and the second screen is greater than the first screen ruling and less than double the first screen ruling.

In the second aspect, it is preferable that the tint block image generation device further has a density setting unit, which, in response to a density setting input for a tint block image, selects the second screen ruling corresponding to the density setting input, wherein the latent image portion generation unit generates the first dots of which size corresponds to the second screen ruling selected by the density setting means, based on a dot clustered screen.

In the second aspect, it is preferable that the background portion generation unit generates a background portion dot image in which the plurality of second dots and the plurality of third dots are placed at fixed positions in the background portion, and uses a dot image having a second screen ruling selected corresponding to the density setting input for the tint block image as the background portion dot image, out of a plurality of dot images having a plurality of second screen rulings respectively.

It is preferable that the latent image portion generation unit generates the first dots having a size which allows to reproduce the same output density as the dot image having the selected second screen ruling, based on a dot clustered screen.

To achieve the above object, a third aspect of the present invention provides a computer readable medium which stores a tint block image generation program for generating tint block image data which forms a tint block image including a latent image portion, which is reproduced during copying, and a background portion, of which output density drops during copying, on a print medium, the program causing a computer to execute: a latent image portion generation step of generating data of a plurality of first dots in the latent image portion; and a background portion generation step of generating data of a plurality of second dots and data of a plurality of third dots which are dispersed at fixed positions among the second dots, in the background portion.

In the third aspect, it is preferable that the plurality of second dots have a second screen ruling and the size of the third dots is smaller than that of the second dots, and the background portion generation step generates dot image data of the background portion made up of the second and third dots, and uses dot image data having a second screen ruling selected corresponding to the density setting input for the tint block image, out of a plurality of types of dot image data having a plurality of second screen rulings respectively.

It is preferable that the latent image generation step generates the data of the first dots having a size corresponding to the selected second screen ruling, based on a dot clustered screen.

To achieve the object, a fourth aspect of the present invention provides a tint block image generation device for generating a tint block image including a latent image portion, which is reproduced during copying, and a background portion, of which output density drops during copying on a print medium, having: a latent image portion generation unit, which generates a plurality of first dots in the latent image portion; and a background portion generation unit, which generates a plurality of second dots and a plurality of third dots which are dispersed in fixed positions among the second dots, in the background portion.

In the fourth aspect, it is preferable that the plurality of second dots have a second screen ruling, and the size of the third dots is smaller than that of the second dots, and the background portion generation unit uses a dot image having a second screen ruling selected according to the density setting input for the tint block image, out of a plurality of types of dot images having a plurality of second screen rulings respectively, as an dot image of the background portion made up of the second and third dots.

It is preferable that the latent image generation unit generates the first dots having a size corresponding to the selected second screen ruling based on a dot clustered screen.

To achieve the above object, a fifth aspect of the present invention provides a computer readable medium which stores a tint block image generation program for generating tint block image data which forms a tint block image including a latent image portion and a background portion of which output density drops more than that of the latent image portion during copying, on a print medium, the program causing a computer to execute: a latent image portion generation step of generating latent image data for forming a latent image which has a plurality of first dots and which has a predetermined output density in the latent image portion; and a background portion generation step of generating, in the background portion, a background image data for forming a background image which has a plurality of second dots and a plurality of third dots which are dispersed among the second dots and of which size is smaller than that of the second dots, the background image having a predetermined output density.

In the fifth aspect, it is preferable that the computer is caused to execute further a density setting step of, in responding to a density setting input for a tint block image, setting a density setting value, wherein in the latent image portion generation step, out of first and second latent images having a first output density and a second output density, which is greater than the first output density respectively, the first or the second latent image having the first or second output density, whichever corresponds to the density setting value, is selected, and in the background portion generation step, out of the first and second background images having a third and fourth output density corresponding to the first and second output density respectively, the first or second background image having the third or fourth output density, whichever corresponds to the density setting value, is selected.

To achieve the above object, a sixth aspect of the present invention provides a tint block image generation device for generating a tint block image including a latent image portion and a background portion of which output density drops more than the latent image portion during copying, on a print medium, having: a latent image portion generation unit, which generates a latent image which has a plurality of first dots and has a predetermined output density in the latent image portion; and a background portion generation unit, which generates, in the background portion, a background image which has a plurality of second dots and a plurality of third dots which are disposed among the second dots and of which size is smaller than that of the second dots, the background image having a predetermined output density.

In the sixth aspect, it is preferable that the tint block image generation device further has a density setting unit, which, in response to a density setting input for a tint block image, sets a density setting value, wherein out of first and second latent images having a first output density and a second output density, which is greater than the first output density respectively, the latent image portion generation unit selects the first or second latent image having the first or second output density, whichever corresponds to the density setting value, and generates the latent image, and out of a first and second background images having a third and fourth output density corresponding to the first and second output density respectively, the background portion generation unit selects a first or second background image having the third or fourth output density, whichever corresponds to the density setting value, and generates the background image.

BRIEF DESCRIPTION OF THE DRAWINGS

FIG. 6 shows a latent image portion dither matrix 33 and an image L1 of the latent image portion generated thereby;

FIG. 10 shows examples of a tint block arrangement;

DESCRIPTION OF THE PREFERRED EMBODIMENTS

Embodiments of the present invention will now be described with reference to the drawings. The technical scope of the present invention, however, shall not be limited to these embodiments, but extend to matters stated in the Claims and equivalents thereof.

Figure 5:
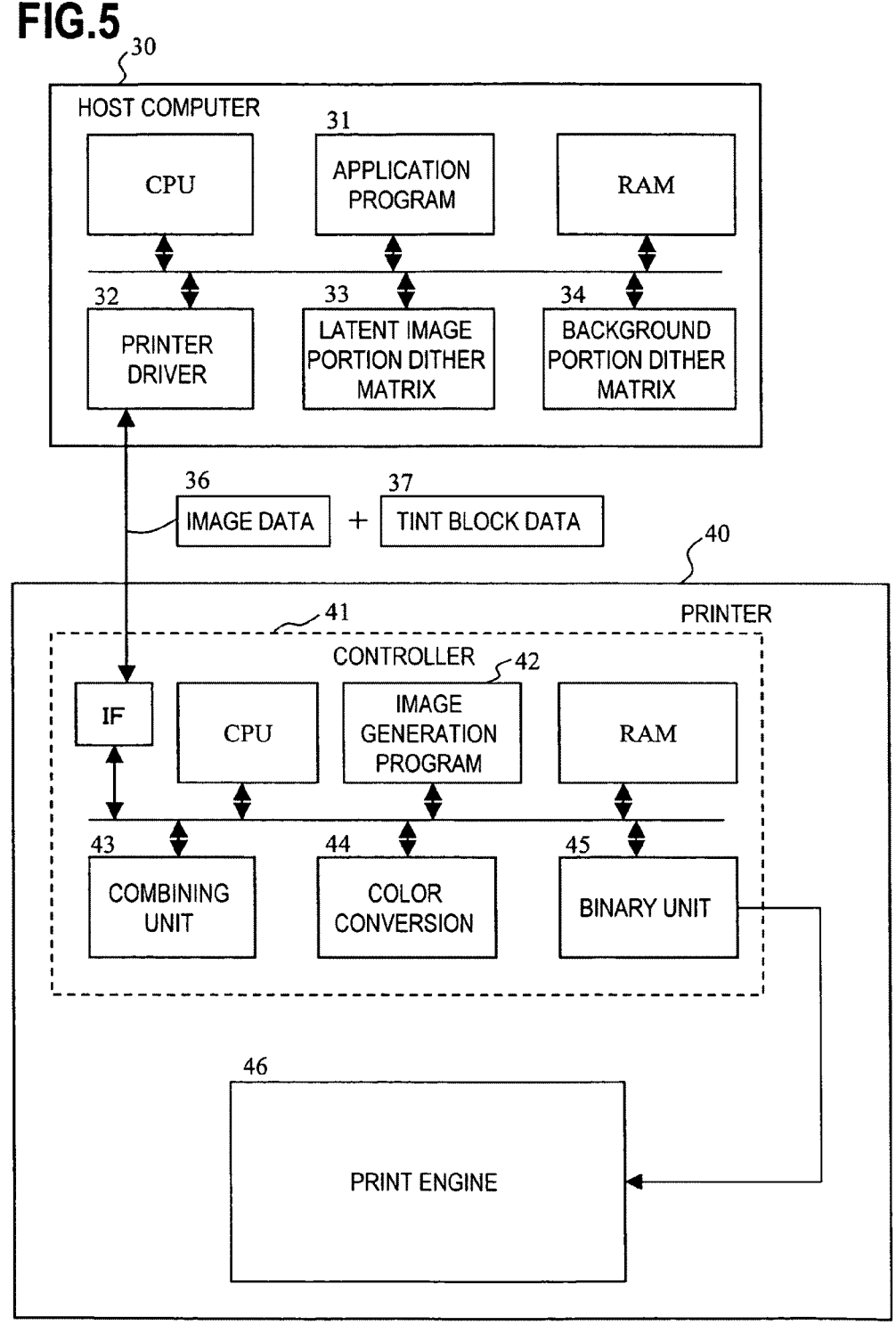
FIG. 5 is a diagram depicting a configuration of a tint block image generation device according to the present embodiment.

FIG. 5 is a diagram depicting a configuration of a tint block image generation device according to the present embodiment. The tint block image generation device comprises a printer driver program 32, a latent image portion dither matrix 33, a background portion dither matrix 34 which are installed in a host computer 30, and a printer 40. The latent image portion dither matrix 33 and the background dither matrix 34 are included in a printer driver program 32, which the printer manufacturer distributes to users via a recording media or via such a network as the Internet, and are stored in a recording media in the host computer when the printer driver program 32 is installed in the host computer. The host computer 30 further comprises a CPU, a RAM and an application program 31, and generates image data comprised of text, images and graphics, by executing the application program 31. The host computer 30 also generates tint block data 37 using the printer driver 32. When a print request is received from the user for the image data generated by the application 31, the printer driver generates a print job of the printing target image data 36 based on a printer control language which the printer device 40 can interpret. If the print request from the user includes a request to add the tint block data to the printing target image data 36, then the printer driver 32 generates the tint block data, includes the tint block data 37 in the print job, and sends this data to the interface IF of the printer 40.

The image data 36 could take various forms, such as data described by a page description language, a data developed into intermediate code of the printer, and RGB bit map data developed into pixels. The tint block data 37 is also data to indicate the ON/OFF of dots in each pixel, for example. The ON/OFF of the tint block data is represented by binary values, 0 and 1, for each pixel, for example. If the printing target image data is represented by an 8-bit grayscale value for each color, R, G and B, then the ON/OFF of the dots of the tint block data may be represented by 8 bits for each pixel, where a value of ON corresponds to the maximum grayscale value 255, and a value of OFF corresponds to the minimum grayscale value 0.

The printer 40, on the other hand, comprises a print engine 46, which comprises a print medium providing unit, a print execution unit for generating an image on a print medium, and a print medium discharge unit, and a controller 41 for performing a predetermined image processing on a received image data 36 and tint block data 37, and controlling the print engine 42. A CPU of the controller 41 executes an image generation program 42 and generates bit map data by developing the received image data 36 into pixels. If the received image data 36 is already in bit map data format, this bit map data can be directly used.

A combining unit 43 combines bit map data which has a grayscale value for each pixel of the image data 36, and dot data of the tint block data 37. A color conversion unit 44 converts the color of combined RGB data into CMYK data, a binary unit 45 converts the CMYK bit map data into a data of dots in a pixel using a predetermined screen, and outputs the result to the print engine 46. As a result, the print engine 46 prints a combined image of the image generated by the application program and the tint block image on the print media. This is the original.

According to another combining method, the color of RGB bit map data of the image data 36 is converted into CMYK bit map data, and the tint block data 37 is combined with a bit map data having any one color of CMYK. In this case, the dot ON/OFF information for each pixel of the tint block data 37 is used as the maximum grayscale value/minimum grayscale value of the bit map data, and this bit map data of any one color of CMYK of the image data 36 is overwritten by this tint block 37. For example, if the image data 36 is text data of black K, the bit map data of any one color of CMY is converted into tint block data 37. Or the pixels of which grayscale value is the minimum density of the bit map data of any one color of the image data 36 is overwritten by the tint block data 37.

In the embodiment in FIG. 5, the printer driver 32 of the host computer 30 corresponds to the tint block image generation program, and generates the tint block data 37. Alternatively, the tint block image may be generated in the printer, and the tint block image may be generated based on this data. In this case, the printer driver 32 generates a print job data, including the specifications of combining the tint block image with the print target image data 36, and specifying the printing, the print job data including information required for generating the tint block data, such as the specifications for text and pattern which will be lost or will be reproduced during copying, specifications of the density of the tint block, and specifications on the addition of camouflage and the controller 41 of the printer 40 executes the tint block image generation program, and generates the tint block data from the job data in which generating the tint block is instructed, using the latent image portion dither matrix and the background portion dither matrix stored in the printer 40. The tint block generation processing in the printer 40 may be performed by the CPU of the printer executing an image generation program, or by being executed in such a dedicated image processing generation device that is ASIC-based.

Now the tint block image generation method by the tint block image generation device (host computer, in the case of the tint block image being generated by the printer driver 32, and the printer 40, in the case of the tint block image being generated by the image generation program) will be described. In the present embodiment, the tint block image generation device generates tint block image data comprised of a latent image portion and a background portion, corresponding to a latent image mask pattern which the user selected from default patterns, or a latent image mask pattern which the tint block generation device generated according to the specifications, including text and character size, by the user.

The tint block image data of the latent image portion has data of first dots based on the latent image portion dither matrix 33, and when this tint block image data is printed, an image with a predetermined output density is generated in the latent image portion. The tint block image data of the background portion has data of a plurality of second dots and third dots based on the background portion dither matrix 34, and when this tint block image data is printed, an image with a predetermined output density is generated in the background portion.

Figure 6:
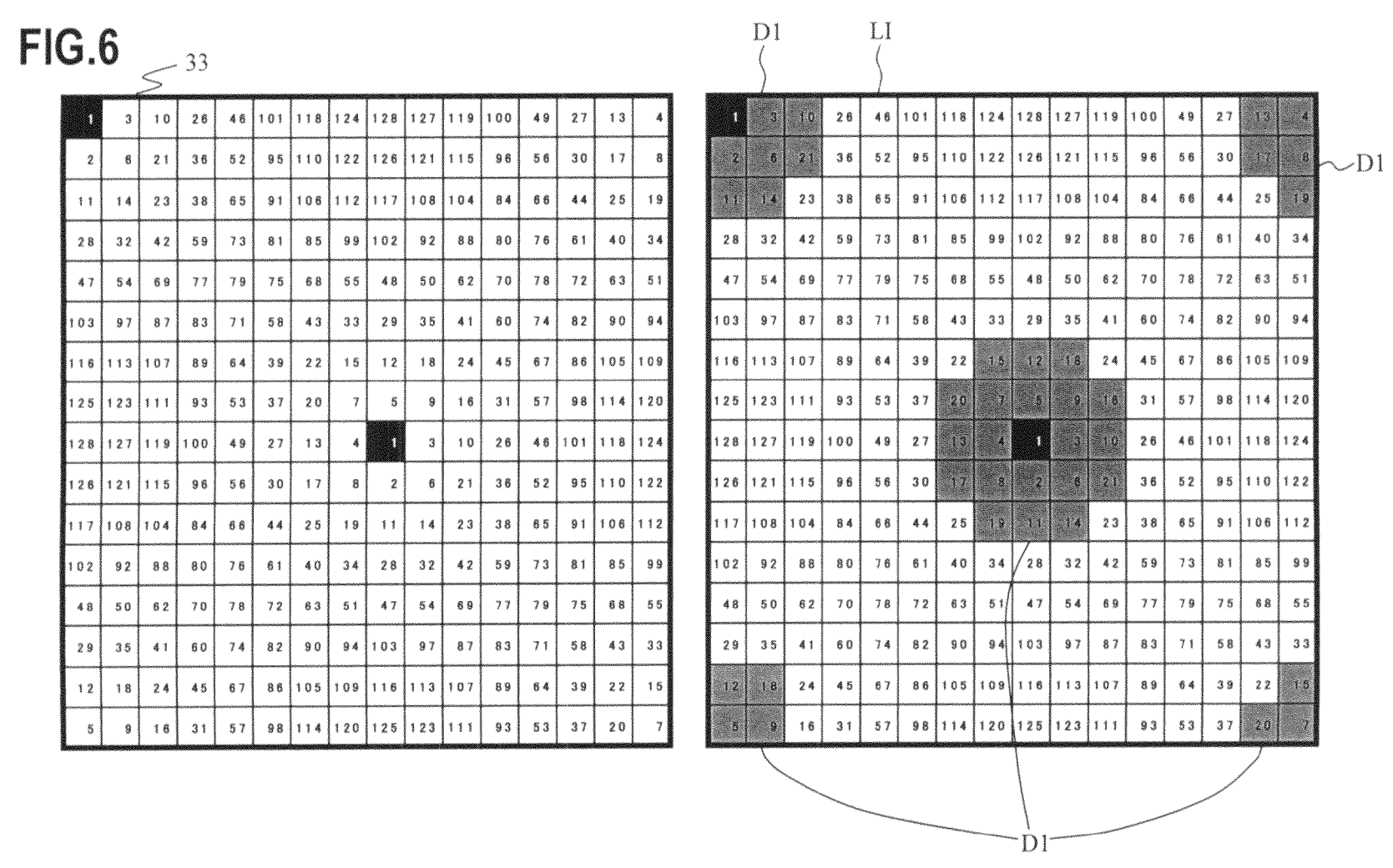

FIG. 6 shows a latent image portion dither matrix 33 and an image LI of the latent image portion generated thereby. The latent image portion dither matrix 33 shown in FIG. 6 is a dot clustered dither matrix of which screen ruling is 53 lpi. The latent image portion dither matrix 33 is a threshold matrix of which size is 16×16, and where the thresholds 1 to 128 are arranged in each cell. The cell corresponding to the center of a half tone dot, having the threshold 1, is arranged at the positions of the two displacement vectors (8, 8) and (−8, 8), and the area of a parallelogram determined by an inner product of the two displacement vectors is 128, and the threshold is 1 to 128 for 128 levels. The cell with the threshold 1 is the center of the half tone dot, and as the input grayscale value increases from 0 to 128, the dot area gradually increases from the center of the half tone dot.

The image LI of the latent image portion in FIG. 6 has a predetermined output density because of a plurality of first dots D1, which is generated where the input grayscale value is 21. In other words, the first dot D1 is a half tone dot having a size corresponding to the input grayscale value and a cluster of dots of pixels corresponding to the cells having a threshold equal or less than the input grayscale value in the dither matrix (hereafter "pixel dots"). The center of the half tone dot is always located at a position of the displacement vector, so the first dots D1 have a fixed first screen ruling of 53 lpi.

Figure 7:
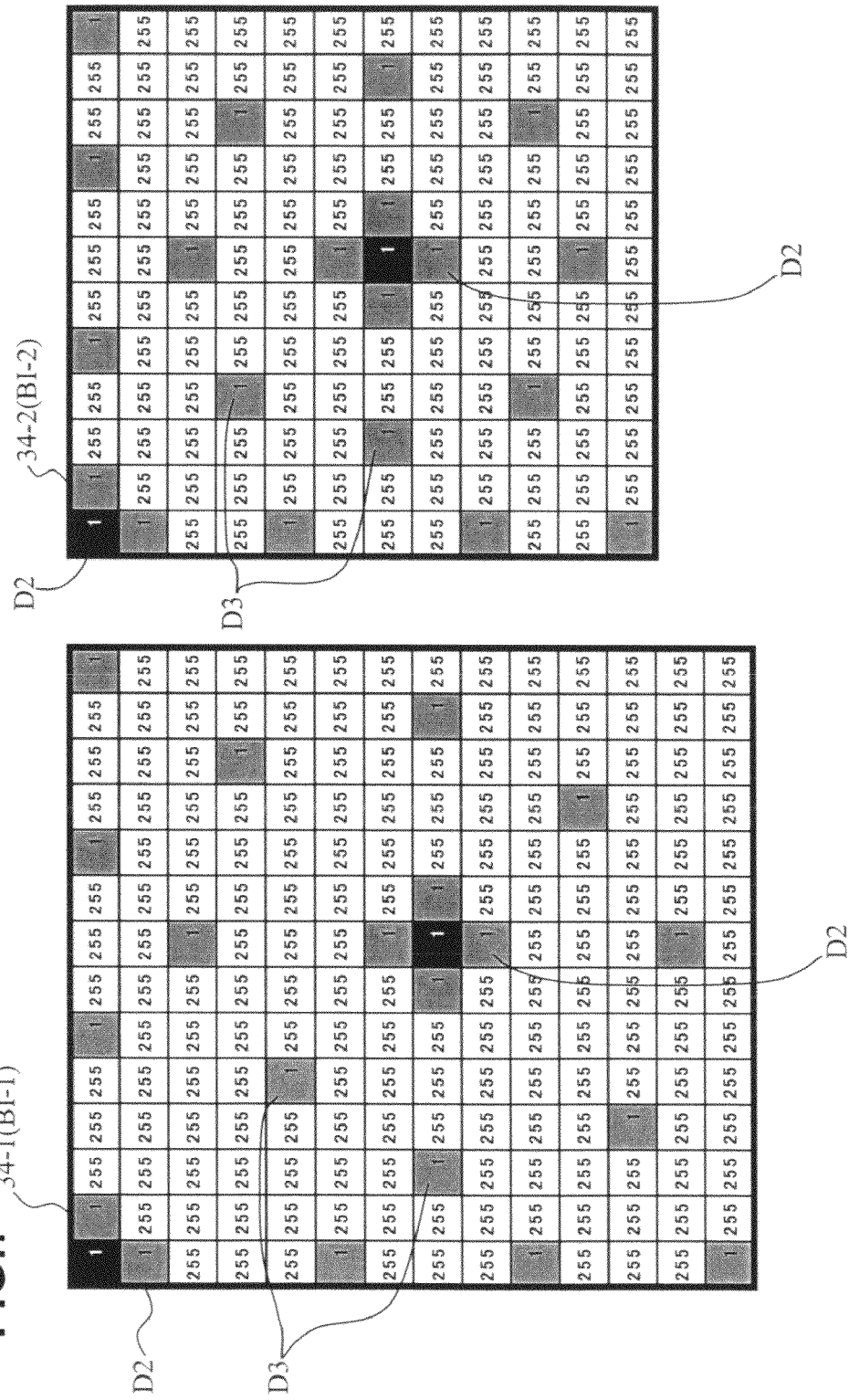
FIG. 7 shows a background portion dither matrix 34 and an image B1 of the background portion generated thereby.

FIG. 7 shows a background portion dither matrix 34 and an image BI of the background portion generated thereby. This background portion dither matrices 34-1 and 34-2 are the threshold matrices of which size are 14×14 and 12×12, and where the thresholds 1 and 255 are arranged in each cell. A pixel with threshold 1 is comprised of five pixels which are adjacent to each other in a + shape and single pixels which are dispersed among the five adjacent pixels. If the input grayscale value is assumed to be one of 21 to 254, the images BI-1 and BI-2 in the background portion are comprised of second dots D2, which is a cluster of five pixel dots in a + shape, and micro sized third dots D3 which are single pixel dots dispersed among the second dots D2. Specifically, the third dot D3 is arranged at eight fixed positions in the vertical, horizontal and diagonal directions of the second dot D2.

Figure 2:
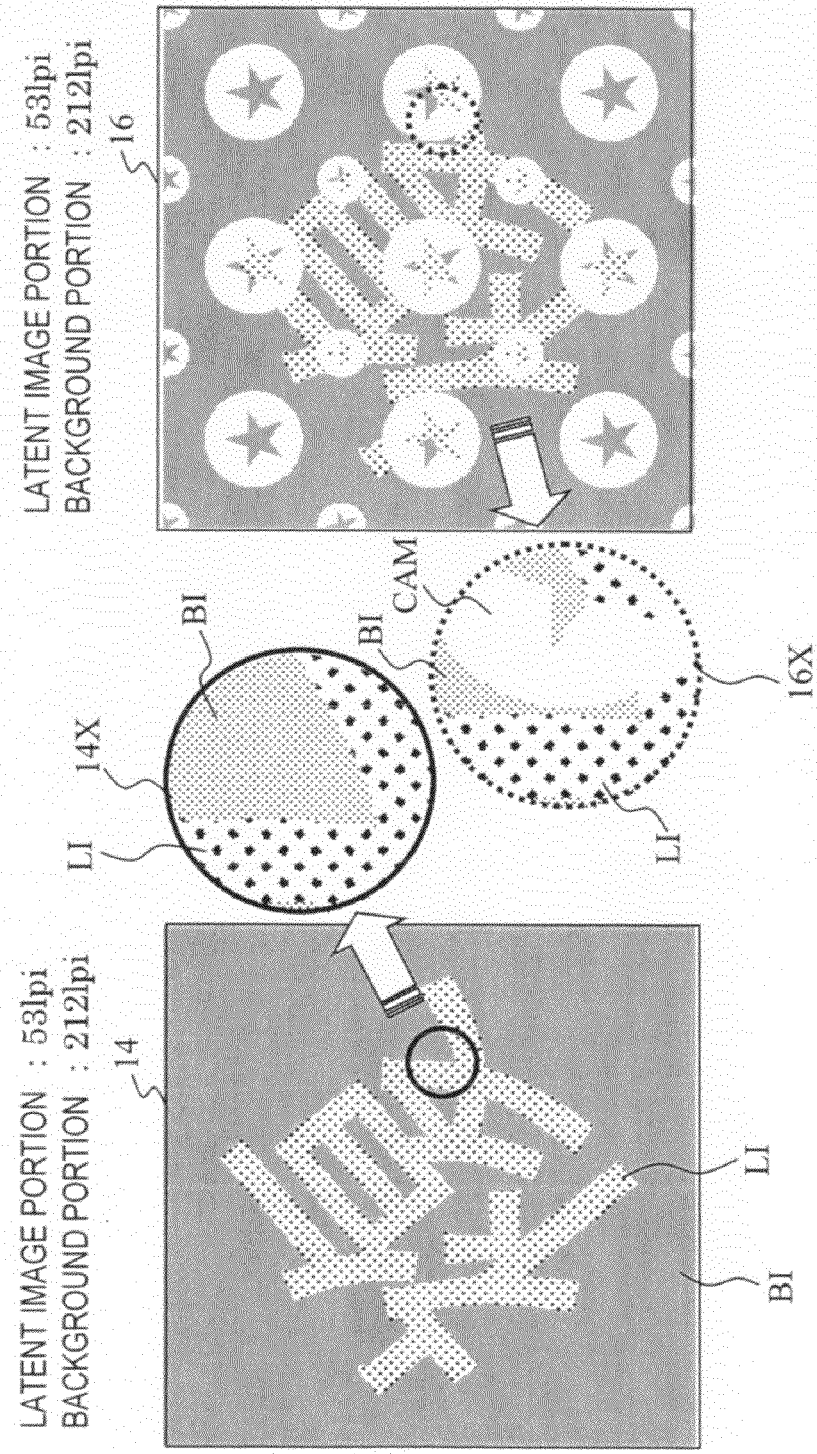
FIG. 2 is a diagram depicting an example of an original of a forgery inhibited tint block.
Figure 3:
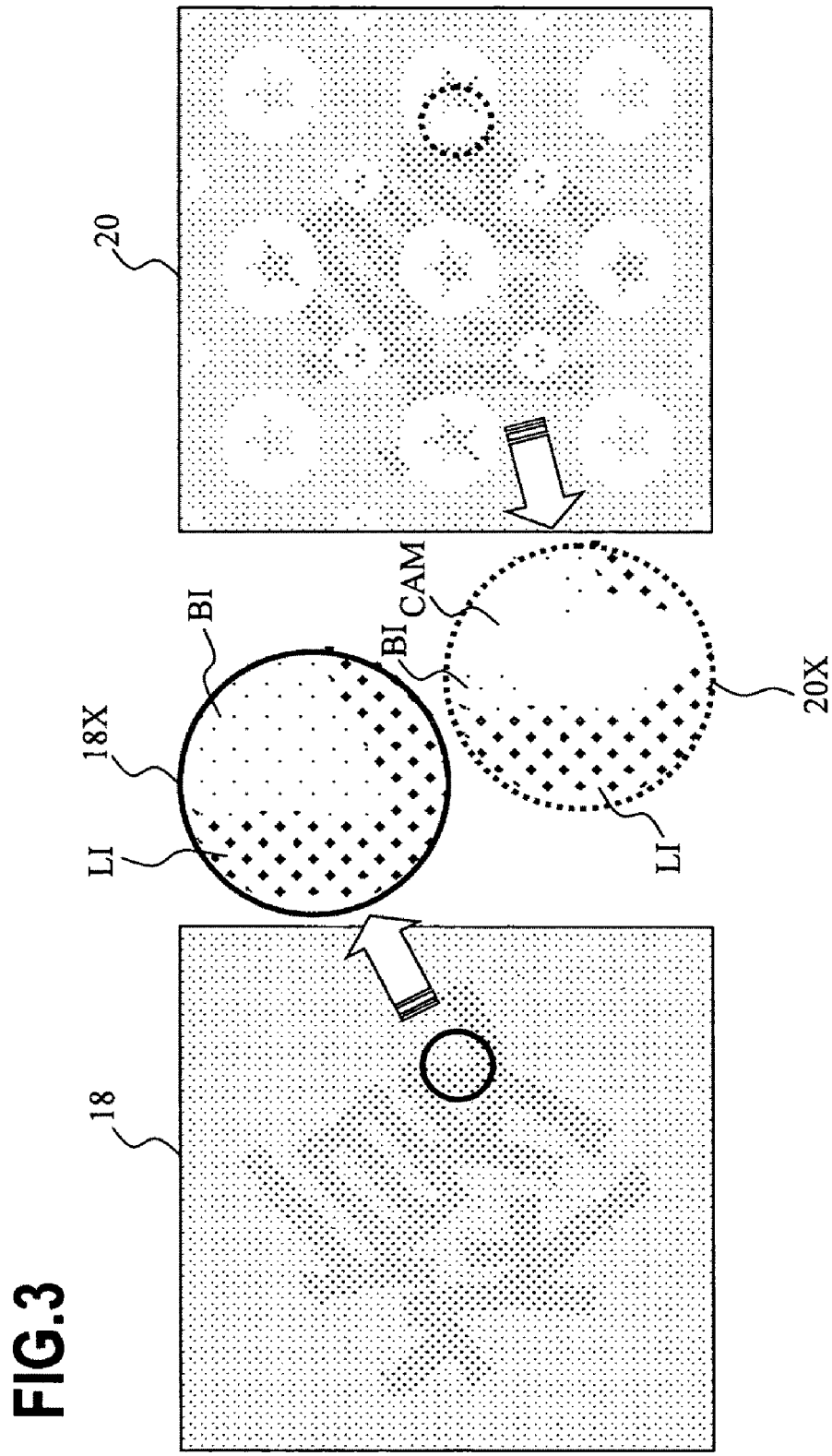
FIG. 3 is a diagram depicting an example of a copy of a forgery inhibited tint block.

The background portion dither matrix 34-1 at the left in FIG. 7 has a 14×14 size, and the center of the half tone dot comprised of the second dots D2 is at the positions of the displacement vectors (7, 7) and (−7, 7), and the second dots D2 have a screen ruling of 61 lpi. Whereas the background portion dither matrix 34-2 at the right in FIG. 7 has a 12×12 size, a little smaller than FIG. 6, and the center of the half tone dot comprised of the second dots D2 is at the positions of displacement vectors (6, 6) and (−6, 6), and the second dots D2 have a screen ruling of 71 lpi. Regardless which dither matrix, 34-1 or 34-2, is used, the second screen ruling (61 or 71 lpi) of the half tone dot comprised of large sized second dots D2 is greater than the first screen ruling 53 lpi of the half tone dot comprised of first dots D1 in the latent image portion dither matrix 33 in FIG. 6, but is less than double the first screen ruling 53 lpi, and compared with the prior art in FIG. 2, the second screen ruling has a number of lines substantially similar to the first screen ruling. The output density of the image of the background portion generated by using the background portion dither matrix 34-1 at the left is lower than the output density of the image of the background portion generated by using the background portion dither matrix 34-2 at the right.

Figure 13:
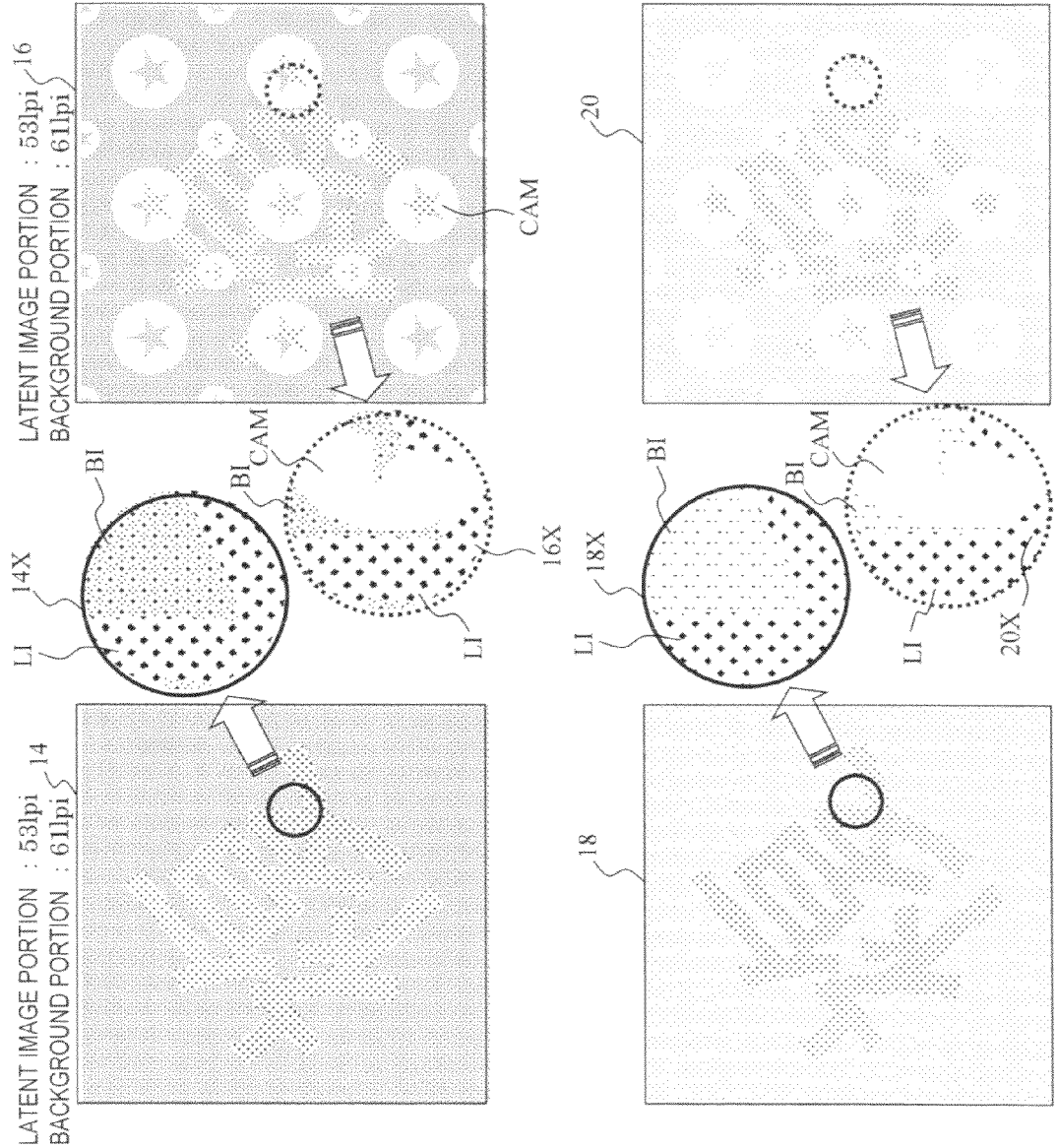
FIG. 13 shows an original and a copy of a tint block image according to an example.
Figure 14:
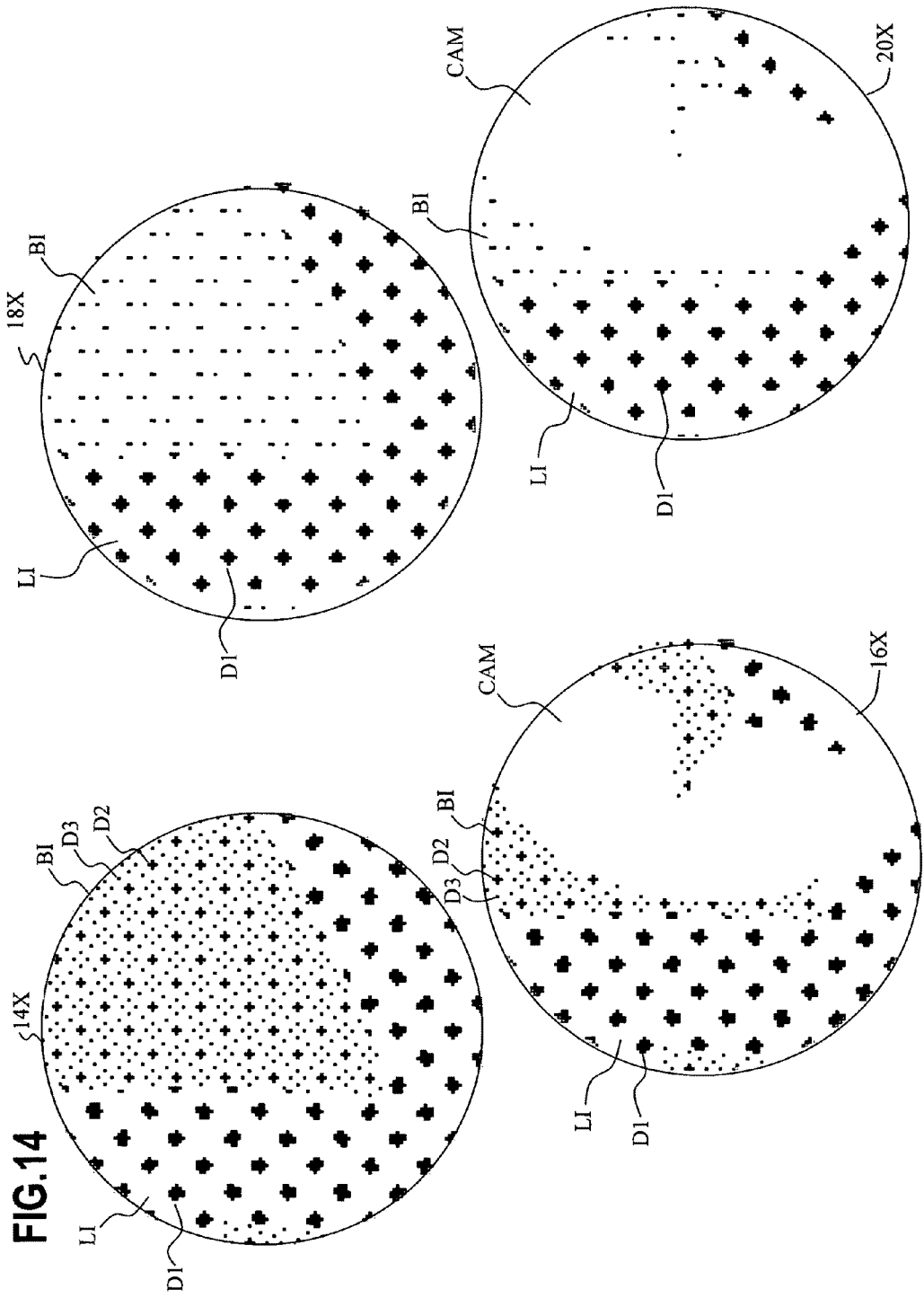
FIG. 14 are enlarged views of the original and the copy of the tint block image in FIG. 13.

FIG. 13 shows the later mentioned originals 14 and 16 in this example, enlarged views 14X and 16X thereof, the copies 18 and 20 thereof, and partially enlarged views 18X and 20X thereof. FIG. 14 shows further enlarged partial views 14X, 16X, 18X and 20X.

In the partially enlarged view 14X of the original where the tint block image generated by the tint block image generation device is printed in FIG. 14, dots in the latent image portion LI and the background portion BI constituting the tint block image are shown. The latent image portion LI is where a plurality of first dots D1, which are generated by the latent image portion dither matrix 33 in FIG. 6 and have the first screen ruling (53 lpi), are printed. As FIG. 6 shows, the first dot D1 is a half tone dot comprised of a cluster of a number of pixel dots corresponding to the input grayscale value. In the example in FIG. 14, the first dot D1 is a half tone dot of which input grayscale is 16, and the first dots D1 is a cluster of 16 pixel dots.

Since the latent image portion LI of the original is comprised of the first dots D1 of which size is relatively large, the pixel dots, which are first dots D1 of the latent image portion LI, are reproduced with little loss in the copy 18X created by copying the original. As a result, the output density of the latent image portion LI hardly drops.

On the other hand, the background portion BI of the partially enlarged view 14X of the original tint block is generated by the background portion dither matrix 34-1 in FIG. 7, where a plurality of second dots D2 which have a second screen ruling (61 lpi), and third dots D3 which are micro dots dispersed at fixed positions among the second dots D2, are printed. As FIG. 7 shows, the second dot D2 is comprised of five adjacent dots in a + shape, and has a second screen ruling substantially similar to the first screen ruling of the latent image portion. The third dot D3 is a micro dot, which is a single pixel dot, and the third dots are dispersed at positions where the distance from the second dots D2 are equal on average, that is, they are dispersed at positions where the positional relationship with second dots D2 is stable in printing.

As a result, in the copy 18X, many micro dots of the background portion BI are lost. And as a result, the output density of the background portion BI drops considerably in the copy, and a latent image emerges because of the contrast with the high output density of the latent image portion LI.

In the original, the input grayscale values of the latent image portion dither matrix are set, so that the output density of the latent image portion LI and the background portion BI become the same. The output density is not simply in proportion to the number of pixel dots per unit area in the tint block image, but also depends on the dot size and dispersion state of the dots. Therefore the input grayscales of the latent image portion dither matrix 33 are selected such that the output density acquired by measuring the printed tint block image with a calorimeter becomes the same between the latent image portion LI and the background portion BI. The input grayscales of the latent image portion dither matrix 33 may be provided without using a calorimeter, such that the output density of the background portion and the output density of the latent image portion become visually the same.

In the background portion BI, it is sufficient if there is a degree of density drop that occurs when the original is copied, and all of the plurality of dots constituting the background portion BI need not disappear. Therefore the background portion BI of the present embodiment has third dots D3 of which size is smaller than the second dots D2, and which disappear more easily than the second dots during copying, in addition to the second dots D2 of which size is smaller than the first dots of the latent image portion, but are relatively large enough to remain without disappearing during copying. Therefore when an original is copied, the third dots D3 disappear, and the output density drops in the background portion BI. As a result, a difference in output density is generated between the latent image portion LI and the background portion BI of the copy, and a latent image can emerge. This is shown in the enlarged view 18X in FIG. 14. In order to make the third dots D3 disappear more easily, the third dots D3 must be micro sized and dispersed, and also must be positioned sufficiently away from the second dots D2 which have a larger size, so as not to influence each other. As mentioned above, the third dot D3 is one pixel dot, and is dispersed to positions between the second dots D2 constituting a half tone dot. In other words, the third dot D3 is dispersed and positioned at vertical, horizontal and diagonal directions from the second dot D2.

In the present embodiment, the background portion BI is not comprised of micro dots with high screen ruling, as in the case of prior art, but is comprised of large sized second dots P2 having a second screen ruling, which is low and close to the first screen ruling of the latent image portion LI, and of micro sized third dots P3, which are dispersed at fixed positions among these second dots. By constructing the background portion of the tint block like this, the following merits can be implemented.

Firstly the background portion has large sized second dots D2 and micro sized third dots D3, so the output density of the background portion can be increased without using high screen ruling, as in the case of prior art. Since the micro sized third dots D3 exist, the third dots D3 effectively disappear, and output density drops during copying, hence the identification capability for the latent image of a copy can be kept high. Also the screen ruling of the second dots is low, so the dots dispersed within the range of reproduction capability of the printer engine can be reproduced. Therefore the output density of the original tint block can be increased by increasing the output density of the background portion BI, and therefore the identification capability for the latent image in the copy can be increased.

Secondly the screen ruling of the second dots in the background portion is relatively low, so the influence of the characteristics of the print engine is small, and density unevenness is not generated in the print image of the background portion of the original. Therefore, as 22 in FIG. 4 shows, the latent image does not stand out, and a drop in concealing capability for the latent image in the original can be avoided.

Figure 4:
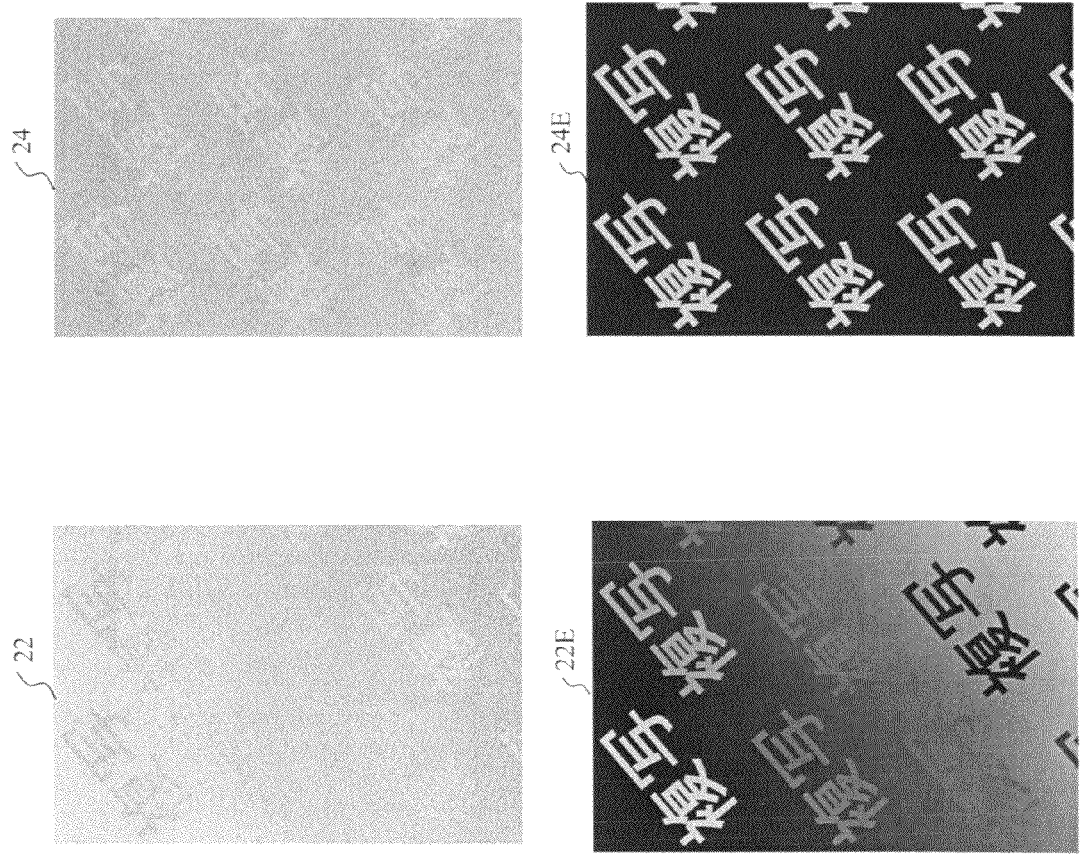
FIG. 4 show a tint block having a density unevenness in the background portion and a tint block having differences in hue and saturation between the background portion and latent image portion.

Thirdly the screen ruling of the second dots in the background portion is close to the screen ruling of the latent image, so if the tint block image is generated by such color toner as magenta and cyan, the difference in hue and saturation, due to the difference of screen rulings as shown in 24 in FIG. 4, does not stand out. Therefore the latent image does not stand out in the original, and a drop in concealment capability for the latent image in the original can be avoided.

Fourthly according to the background portion dither matrix in FIG. 7, the background portion is generated such that the second dots D2 and third dots D3 are dispersed at fixed positions without depending on the input grayscale values of the tint block. To change the output density of the print image of the background portion, the screen ruling of the second dots D2 is changed, as shown in the matrices 34-1 and 34-2 in FIG. 7. In other words, the output density is changed not by changing the half tone dot size, as in the case of a dot clustered screen, but by changing the screen ruling of the large sized second dots D2 while fixing the positional relationships of the second dots D2 and third dots D3. By this, the image of the background portion BI is always generated with maintaining the relationship where the second dots D2 and third dots D3 are dispersed.

This means that the dots in the background portion are stably dispersed when the original is printed, and the micro sized third dots D3 disappear with certainty during copying. Therefore the output density of the background can be increased in the original while maintaining a high concealing capability for the latent image in the original, and the tint block in the original can be printed at high output density so that the identification capability for the latent image in the copy can be further increased.

Fifthly according to the present embodiment, the screen ruling of the second dots D2 of the background portion is changed to change the density of the tint block. In other words, one of the plurality of dither matrices having a different second screen ruling in FIG. 7 is selected. There are two background portion dither matrices in FIG. 7, but three or more background portion dither matrices may be prepared in advance. Then input grayscale values, to be applied to the latent image portion dither matrices, are selected according to the output density of the print image which is generated by the selected background portion dither matrices. The input grayscale values may be default values selected by the printer manufacturer for each background portion matrix to be provided, prior to shipment, or may be updated by the user or service personnel according to the age deterioration of the printer engine characteristics. An image of the latent image portion is comprised of the first dots (half tone dots) D1 having a size corresponding to the input grayscale values based on the selected input grayscale value and the latent image portion dither matrix 33 in FIG. 6.

The latent image portion has the first dots D1 based on the dot clustered screen which has multi-level thresholds, so the first screen ruling is relatively low, allowing many grayscale values. Therefore the output density of the print image of the latent image portion can be closer or can perfectly match the output density of the background portion, and the concealment capability for the latent image in the original can be further increased.

Figure 8:
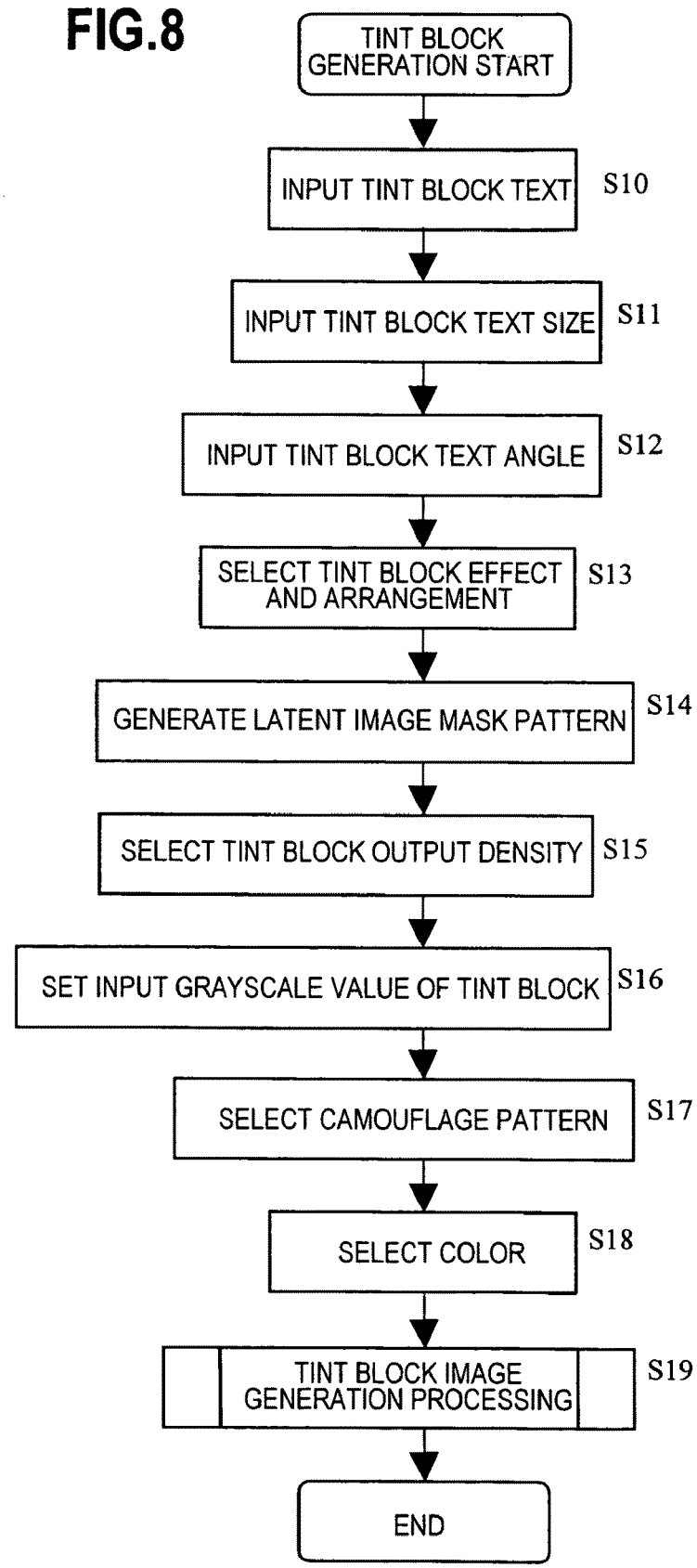
FIG. 8 is a flow chart depicting a tint block generation method according to the present embodiment.

FIG. 8 is a flow chart depicting the tint block generation method according to the present embodiment. In the printer driver 32 of the host computer 30, the printer user selects the tint block generation menu. The printer driver program 32 executes the generation of tint block image data according to the flow chart in FIG. 8. First the printer driver program provides a user interface to the user for setting the tint block printing. The printer driver input the text of the tint block by the user via this user interface, and acquires the tint block text (S10). For example, the text is "COPIED", "DUPLICATE" or "confidential", and this text becomes the latent image of the tint block. Also corresponding the size of the tint block text, such as 48 point, the angle of the tint block text, and the arrangement of the tint block effect, which are input by the user, the printer driver acquires the size of the tint block text, the tint block angle, the tint block effect and the arrangement (S11), (S12) and (S13). The tint block effect is whether the text is void (text is white and the surrounding is black in the tint block mask pattern) or embossed (text is black and the surrounding is white in the tint block mask pattern). In the case of void, the text becomes the background portion and the surrounding becomes the latent image portion, and in the case of embossed, the text becomes the latent image portion and the surrounding becomes the background portion. The arrangement of the tint block is square, oblique and inverted, for example.

Figure 9:
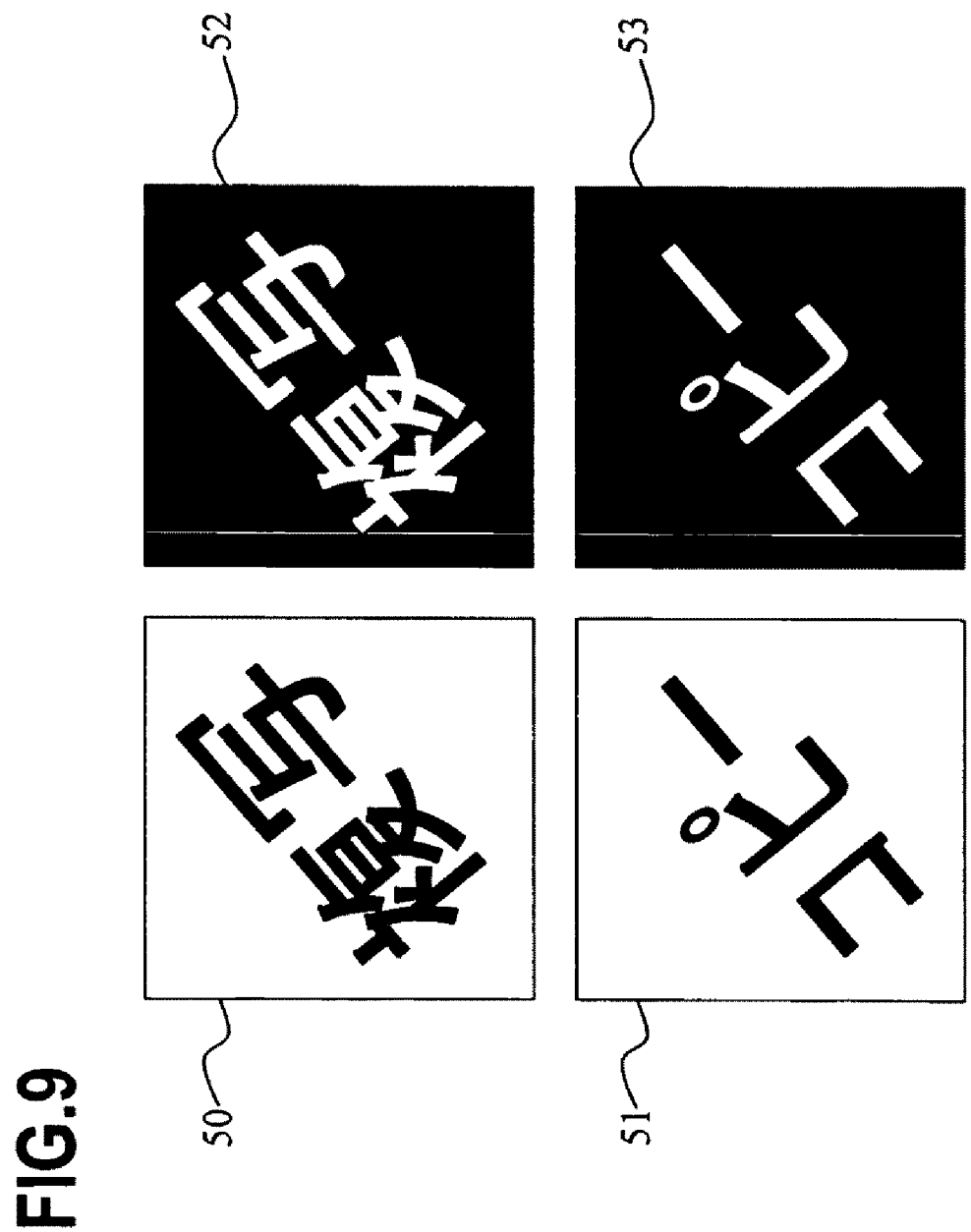
FIG. 9 shows an example of the tint block effect.

FIG. 9 shows an example of the tint block effect. The tint block patterns 50 and 51 are the text COPIED and DUPLICATE, the text is embossed in the original or in the copy thereof. The tint block patterns 52 and 53 are the same above text, but are examples of the tint block effect when the text is void in the original or in the copy. In both cases, the angle of the text is set to 40 degrees.

FIG. 10 shows examples of the arrangement of a tint block. In all these cases, the text is COPIED, the angle is 40 degrees, and the tint block effect is embossed. In the case of (a) square arrangement, the tint block image is generated so that the latent image mask pattern is attached like a tile. In the case of (b), an oblique arrangement, the latent image mask pattern is shifted by a predetermined phase at every line feed. And in the case of (c), an inverted arrangement, the latent image mask pattern is vertically inverted at every line feed.

Figure 1:
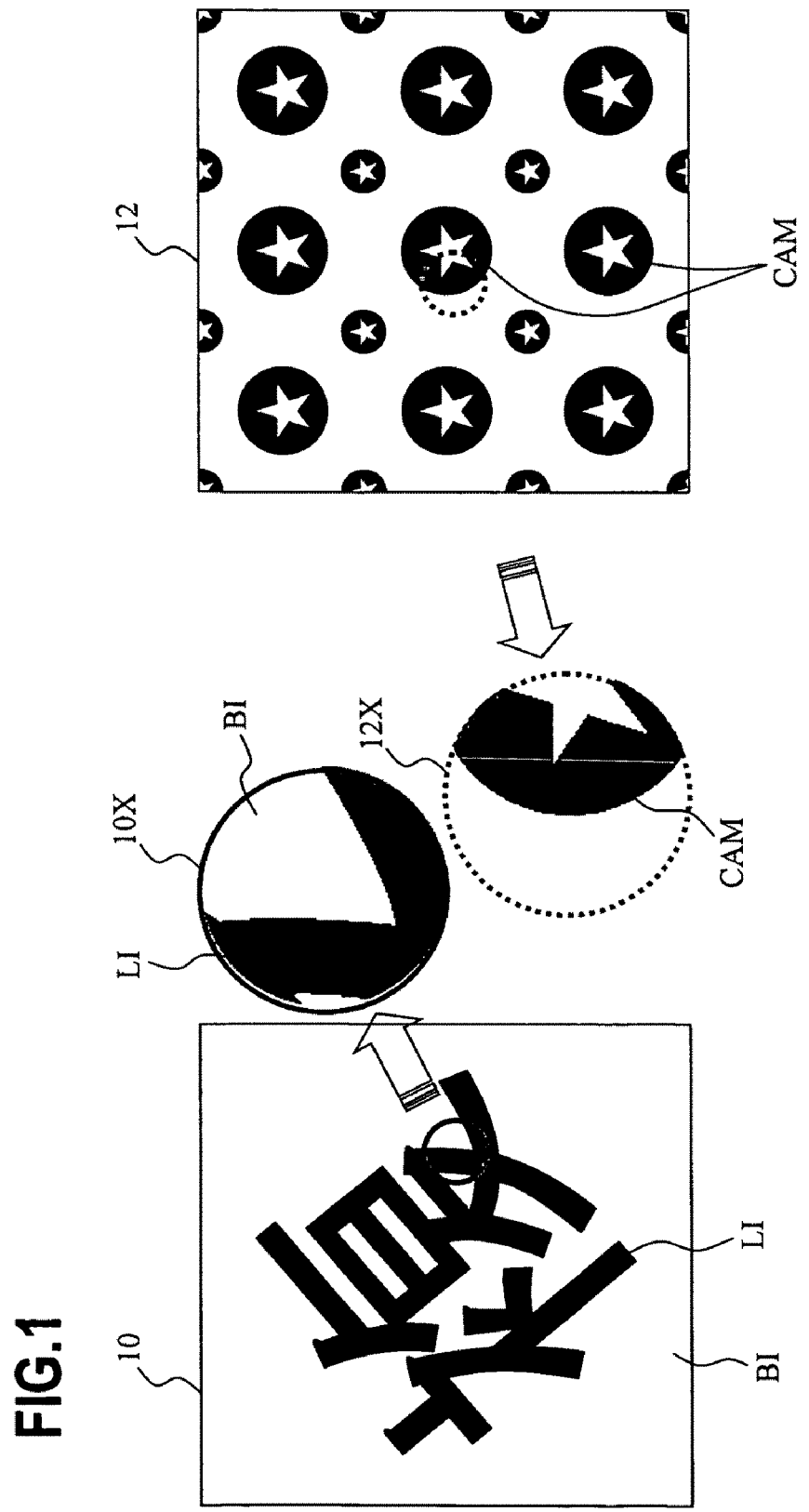
FIG. 1 is a diagram depicting an example of a latent image of a forgery inhibited tint block and a camouflage pattern.

When the user finishes input or selection in steps S10 to S13, the printer driver 32 generates a latent image mask pattern (S14). An example of the latent image mask pattern is shown in FIG. 1.

The user actually prints and copies the tint block, or confirms that it is correct on a preview screen, so as to select an optimum tint block output density (normal or high) (S15). Normally the identification capability for the latent image in the copy can be increased by increasing the output density of the tint block. Corresponding to the selected tint block output density (normal or high), the printer driver program 32 selects one of the background portion dither matrices shown in FIG. 7. In the background portion dither matrix 34-1, the screen ruling of the dots D2 is low (61 lpi), and the output density is low. Whereas in the background portion dither matrix 34-2, the screen ruling of the dots D2 is high (71 lpi), and the output density is high. In other words, responding to the selection of the tint block output density by the user, a background portion dither matrix 34 having a corresponding screen ruling is selected. The number of types of background portion dither matrices 34 may be three or more (normal, high, very high).

The printer driver 32 sets the input grayscale value of the tint block, in response to the selection of the tint block output density by the user (S16). In the present example, in particular, if the user selects the tint block output density "normal", the printer driver 32 selects the background portion dither matrix 34-1, and sets the input grayscale value to be used for the latent image portion dither matrix 34 and the background portion dither matrix 34-1 to 16. If the user selects the tint block output density "high", the printer driver 32 selects the background portion dither matrix 34-2, and sets the input grayscale value to be used for the latent image portion dither matrix and the background portion dither matrix 34-2 to 22. As mentioned above, for the input grayscale values, the printer driver 32 may store these default setting values of the printer manufacturer before shipment, for each of the provided background portion matrices, in a predetermined storage area of the host computer, and acquire a value when the tint block is generated. The input grayscale values of this storage area may be updated according to the age deterioration of the printer engine characteristics. Corresponding to the input grayscale value, the latent image portion having the half tone dots (first dots) having a size corresponding to the input grayscale value is generated based on the dot clustered latent image portion dither matrix 33 (FIG. 6). In other words, setting the input grayscale value of the tint block responding to the selection of the tint block output density by the user means selecting a dot image comprised of first dots having a size corresponding to the selected tint block output density.

In the background portion dither matrix 34, the thresholds are only 1 and 255, so if the input grayscale value is in the range of 1 to 254, a pixel dot is generated in a pixel of threshold 1. In other words, the image of the background portion is an image comprised of predetermined second dots D2 and third dots D3. For pre-setting the input grayscale value, images of the background portion and images printed by a latent image portion dither matrix with for various input grayscale values are output by the printer before the printer is shipped, or at a predetermined timing during the period of using the printer, and an input grayscale value whereby the result of measuring the density of these images by a calorimeter matches or is close to each other is selected. The input grayscale value may be decided so that the output density of the background portion and the output density of the latent image portion become visually the same without using a colorimeter.

The user selects a camouflage pattern (S17), and selects a color of the tint block (e.g. black, cyan, magenta) (S18). When S10 to S17, including the input by the user, ends and the printer driver program acquires the tint block setting information from the user, the printer driver 32 executes the tint block image generation processing (S19). The tint block image generation processing is performed according to the flow chart in FIG. 11.

Figure 11:
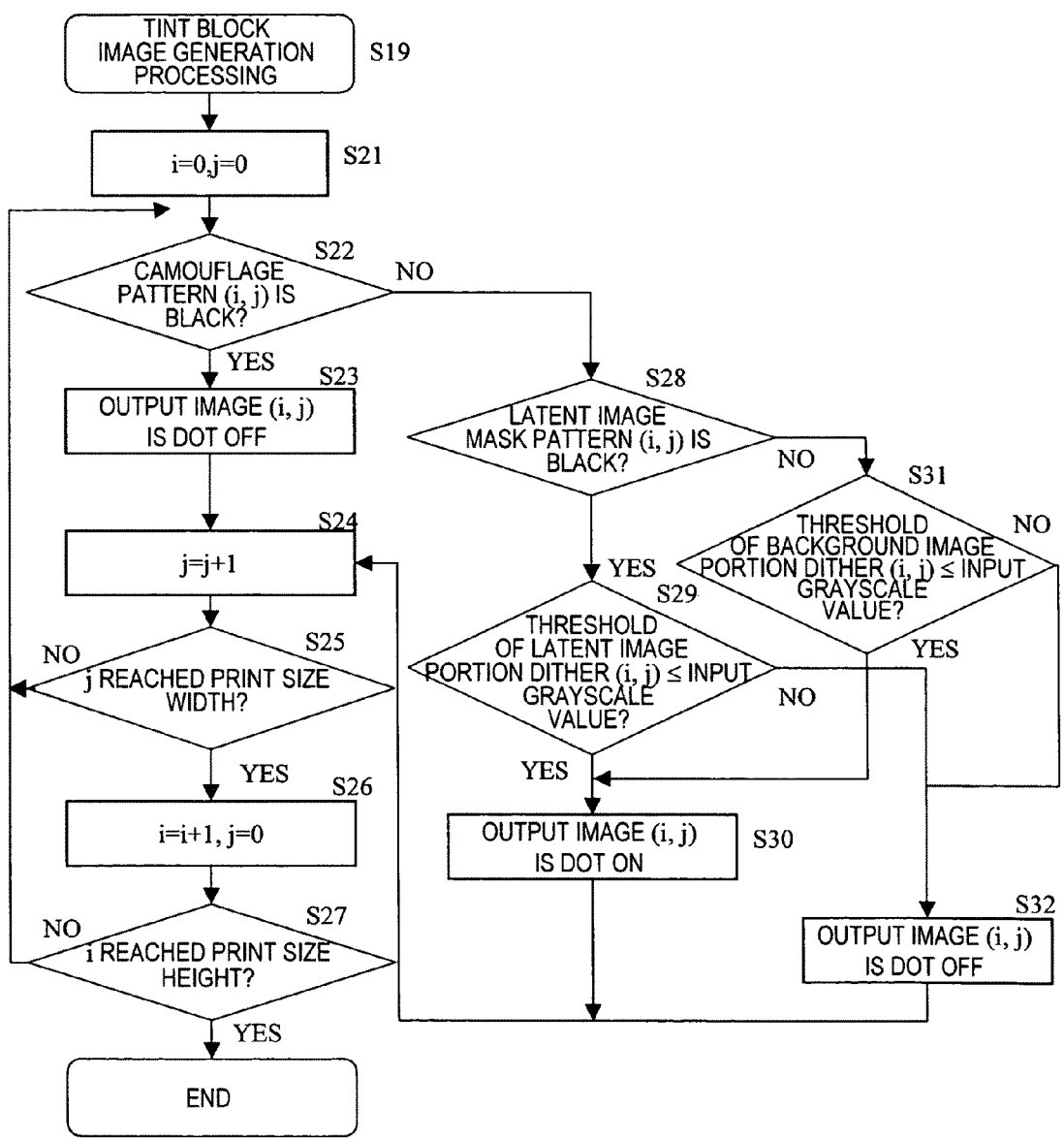
FIG. 11 is a flow chart depicting a tint block image generation processing according to the present embodiment.
Figure 12:
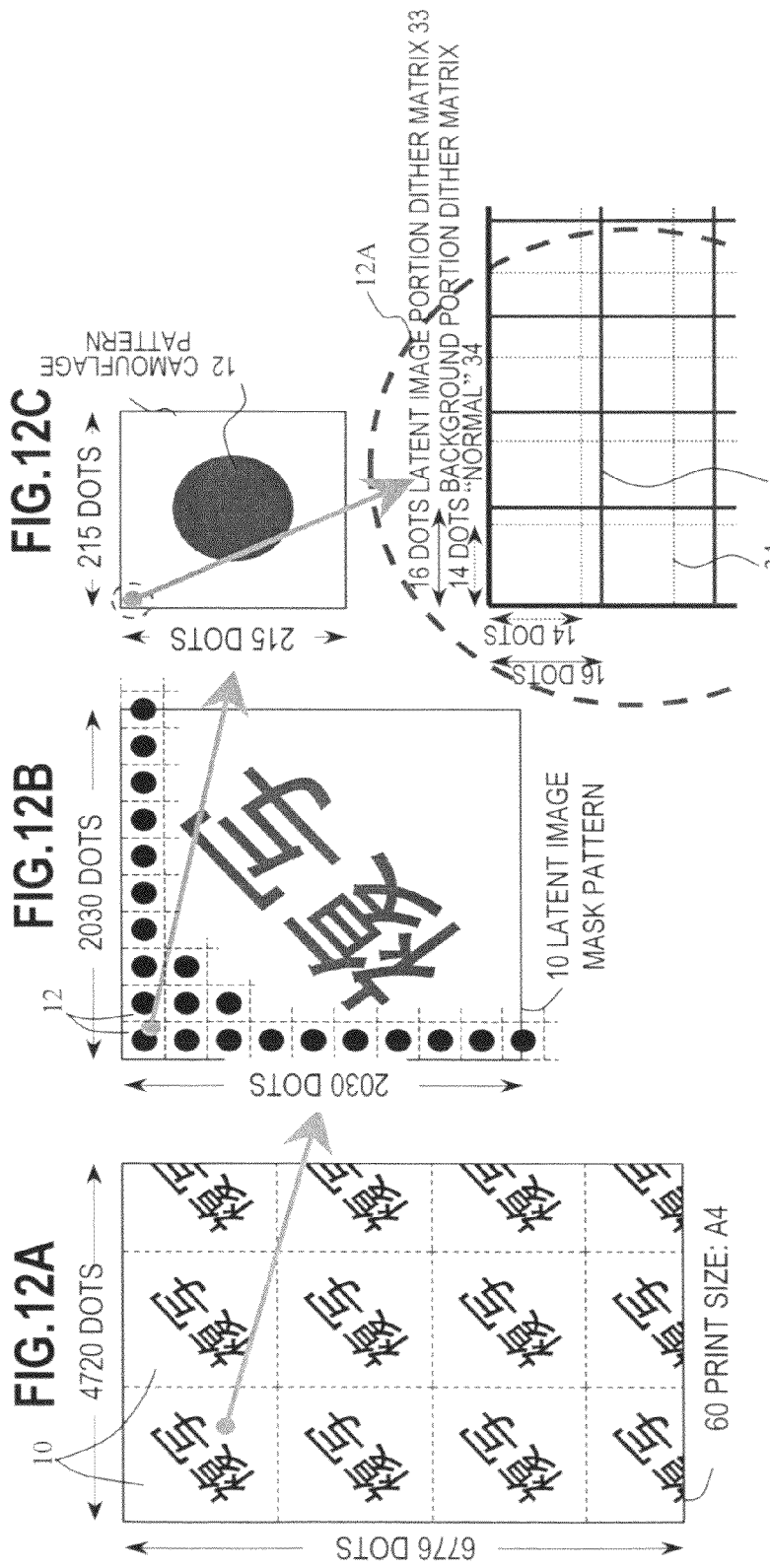
FIG. 12A to FIG. 12D are diagrams depicting the tint block image generation processing in FIG. 11.

FIG. 11 is a flow chart of the tint block image generation processing according to the present embodiment. FIG. 12A to FIG. 12D are diagrams describing the tint block image generation processing in FIG. 11. FIG. 12A shows a tint block image where a plurality of latent image mask patterns 10 are arranged in a square in the A4 print size 60. In the case of the pixels of an A4 size, there are 4720 dots in the horizontal direction and 6776 dots in the vertical direction. FIG. 12B shows the positional relationship of the latent image mask pattern 10 in FIG. 12A, and the camouflage pattern 12 is arranged as tiles. The latent image mask pattern 10 is a square pattern having 2030 dots of pixels in the horizontal direction and 2030 dots of pixels in the vertical direction. The camouflage pattern 12, on the other hand, is a square pattern having 215 dots of pixels in the horizontal direction, and 215 dots of pixels in the vertical direction, as shown in FIG. 12C, where the pattern portion of the camouflage pattern has black information and the other portion has white information.

FIG. 12D is an enlarged view of the upper left edge of FIG. 12C. The latent image portion dither matrix 33 is a 16 cell×16 cell matrix, and each cell matrix 33 is pasted like a tile sequentially from the upper left. The background portion dither matrix 34 is a 14 cell×14 cell matrix of which tint block density is corresponded in a normal way, and each cell matrix 34 is pasted like a tile sequentially from the upper left.

When an output density of the tint block is selected as mentioned above, the background portion dither matrix 34 is selected, and an input grayscale value corresponding to this dither matrix is set. The printer driver compares this input grayscale value and the threshold values of the dither matrices 33 and 34, and sets the pixel dots to ON if the input grayscale value is greater than the threshold, and sets the pixel dots to OFF if the input grayscale value is less than the threshold. The comparison target dither matrix is selected according to the black or white of the latent image mask pattern. The pattern 12A (black) of the camouflage pattern 12 is set to void, where the dots of the latent image portion or background portion are not generated.

According to the flow chart in FIG. 11, the tint block image generation processing S19 will be described. The indexes i and j of the pixels of the tint block image are initialized to i=0 and j=0 respectively (S21). Then if the camouflage pattern at pixel (i, j) is black (YES in S22), the tint block image data (i, j) unconditionally becomes dot OFF. In case where the camouflage pattern is not black (NO in S22), if the latent image mask pattern is black (YES in S28), the threshold of the corresponding cell of the latent image portion dither matrix and input grayscale are compared (S29), and if the latent image portion mask pattern is not black (NO in S28), the threshold of the corresponding cell of the background portion dither matrix and the input grayscale are compared (S31). If the input grayscale value is equal to or more than the threshold in both comparisons, the tint block image data (i, j) becomes dot ON (S30), and if the input grayscale value is less than the threshold, the tint block image data (i, j) becomes dot OFF (S32).

In other words, in the latent image portion, first dots (half tone dots) having a size corresponding to the input grayscale value are generated, and in the background portion, second dots and third dots, arranged at fixed positions based on the background portion dither matrix selected regardless the input grayscale value, are generated.

When the above processing completes, the index j in the row direction of the pixels is incremented (S24), and the same processing is repeated until the index j reaches the print size width (S25). When the index j reaches the print size width (YES in S25), the index i in the column direction is incremented, and the index j in the row direction is reset to 0 (S26), and the same processing is repeated. When the index i in the column direction reaches the print size height (YES in S27), one page of tint block image generation processing completes. In this way, the processing target pixels are processed from the upper left in the raster scan direction, and each pixel is set to dot ON or OFF.

In the flow chart in FIG. 11, the input grayscale value and the threshold of the background portion dither matrix are compared for the pixels of the background portion, and it is judged whether the pixel dot is ON or OFF. However, as described in FIG. 7, if the background portion dither matrix 34 has only two types of thresholds, 1 and 255, and the pixel dot becomes ON if the processing target pixel (i, j) corresponds to the threshold 1 of the matrix, and the pixel dot becomes OFF if the processing target pixels (i, j) correspond to the threshold 255 of the matrix. Therefore a value of each cell of the background portion dither matrix may be a 1-bit value to indicate dot ON or dot OFF, and the tint block image data (i, j) may be set to pixel dot ON or OFF depending on which cell of dot ON or dot OFF of the background portion dither matrix the processing target pixels correspond to.

Figure 17:
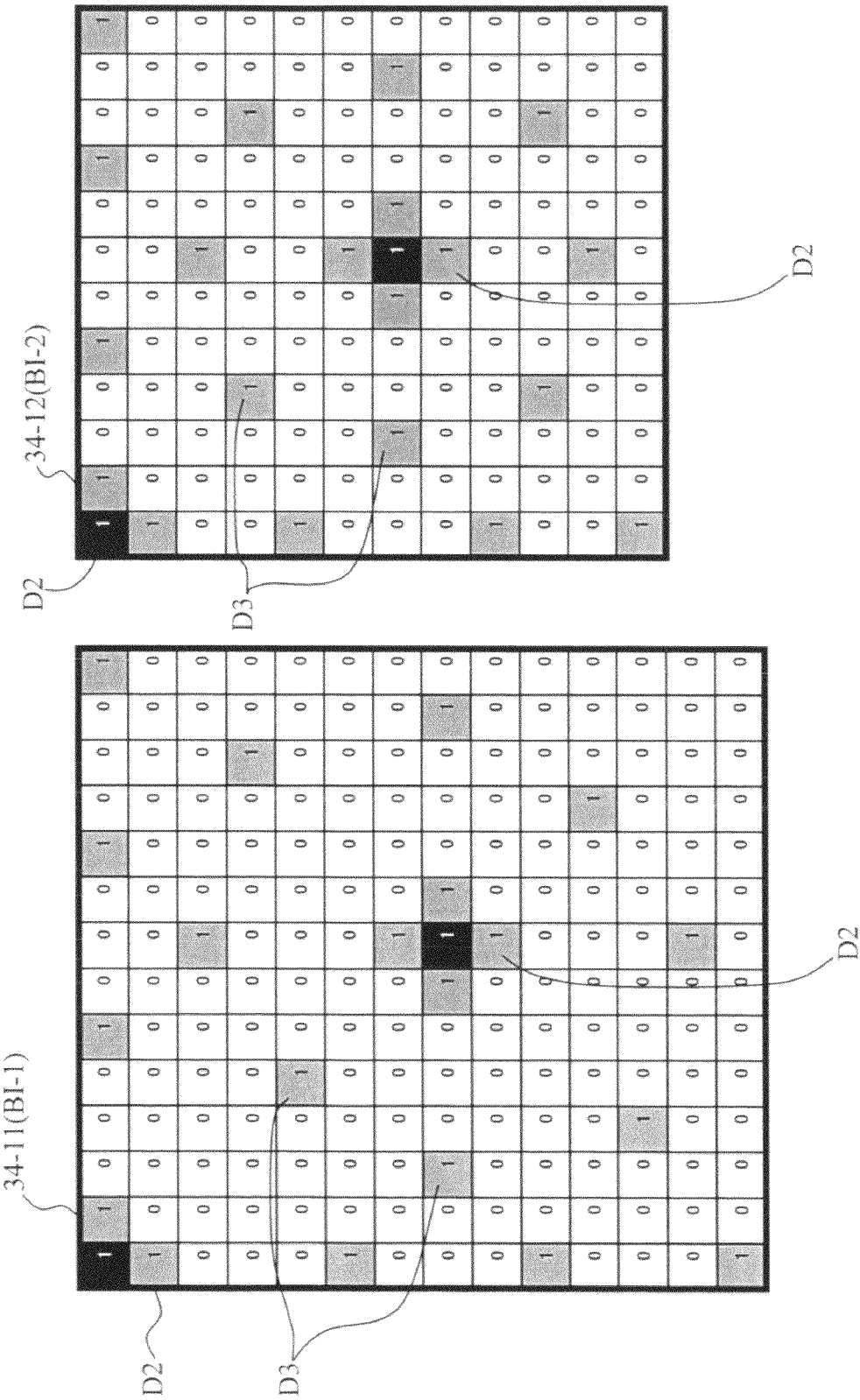
FIG. 17 shows a variant form of a background portion dither matrix.

FIG. 17 show a variant form of the above mentioned background portion dither matrices. As FIG. 7 shows, in the background portion, the value of the input grayscale value does not influence the tint block image generation processing. So the cell of the background portion dither matrix is set to 1-bit data of dot ON/OFF, and if the latent image mask pattern is white (background portion), the data of the cell of the background portion dither matrix is set to the tint block image data (i, j). In this case, the background portion dither matrix is substantially the same as the background image data. And a step of generating the output grayscale according to the comparison of the input grayscale and the threshold of the background portion dither matrix is unnecessary.

For the latent image portion, the tint block image data (i, j) for forming the first dots D1 comprised of half tone dots having a size according to the input grayscale value is generated, referring to the dot clustered dither matrix 33. In other words, the image of the latent image portion having the output density corresponding to the input grayscale value is generated.

The tint block image data of the latent image portion may be generated as follows. In other words, the input grayscale value of the latent image portion can be set to the set values which were fixed before shipment of the printer, for each of the plurality of background portion dither matrices shown in FIG. 7 or FIG. 17. In this case, the data of the cell of the latent image portion dither matrix can be set to 1-bit data to indicate dot ON or OFF.

Figure 18:
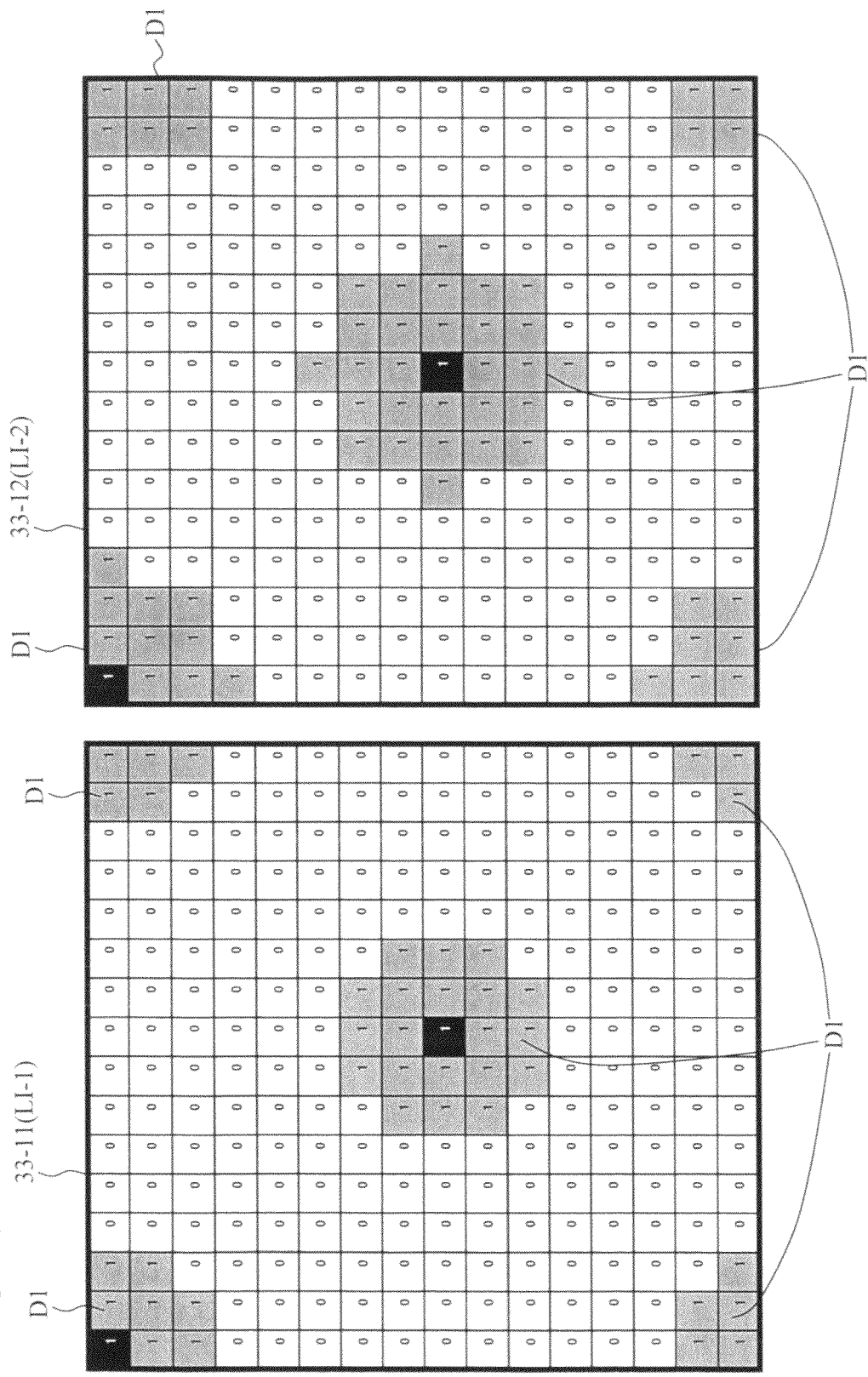
FIG. 18 shows a variant form of a latent image portion dither matrix.

FIG. 18 shows the variant forms of the above mentioned latent image portion dither matrices. In the case of the background portion dither matrix 34-11 in FIG. 17, the input grayscale value of the latent image portion is set to "21", so the corresponding latent image portion dither matrix 33-11 becomes equivalent to the latent image portion dither matrix in FIG. 6, and the first dot D1 is comprised of 21 pixel dots. However the data of each cell of the latent image portion dither matrix 33-11 is "1" or "0" to indicate dot ON or OFF. On the other hand, in the case of the background portion dither matrix 34-12 in FIG. 17, the input grayscale value of the latent image portion is set to "29", for example, so the first dot D1 of the corresponding latent image portion dither matrix 33-12 is comprised of 29 pixel dots.

If the latent image mask pattern is black (latent image portion), the data of the cell of the latent image dither matrix 33-11 or 33-12 is set to the tint block image data (i, j). In other words, in this case, the latent image portion dither matrix substantially becomes equivalent to the latent image data. And the step of generating the output grayscale according to the comparison of the input grayscale and the threshold in the latent image portion dither matrix is unnecessary.

By the above processing, in the area where the camouflage pattern is white, the output image (ON/OFF of pixel dots) of the latent image portion and the background portion are generated according to the latent image mask pattern.

The tint block image generated in this way becomes the tint block image data which has one of dot ON/OFF for each pixel.

The generated tint block image data and the print target image data 36 are combined as follows.

After the print target image data is converted from the RGB bit map data having RGB grayscale values into CMYK bit map data having the colors of the printer, the tint block image is combined with the bit map data having a color of the tint block specified by the user (one of cyan, magenta and black, in the case of this example), out of the CMYK bit map data of the print target image data.

In this combining method, the dot ON data of the tint block image is converted into the grayscale value corresponding to the maximum density of the above mentioned bit map data, and the dot OFF data is converted into the grayscale value corresponding to the minimum density "0" of the bit map data. If the values of RGB are 8-bit grayscale values respectively in the printer, then the grayscale value corresponding to the maximum density is "255", and the grayscale value corresponding to the minimum density is "0". This tint block image data converted into the maximum grayscale value or the minimum grayscale value is overwritten by the grayscale data of the pixels having a grayscale value greater than the grayscale value "0" in the bit map data of the specified tint block color of the print target image data. By this, the tint block image is formed in the pixels having grayscale value "0" in the print target image, and the print target image is formed in the other pixels.

In another combining method, the tint block image data is overwritten on the bit map data with the specified tint block color of the print target image data. For example, if the print target image data is data to form a block character, the CMY bit map data has grayscale value "0" in all the pixels. Therefore the bit map data with the specified tint block color, out of CMY, does not have information of the print target image data, so all the bit map data having this color is replaced with the tint block image data.

The combining method is not limited to the above mentioned overwriting, but may blend the print target image and the tint block image at a predetermined ratio based on the type of image (e.g. text, image, graphic) and the grayscale value of each pixel of the print target image data. Only a portion where the grayscale value of the print target data is "0" for all of CMYK out of the bit map data having the specified tint block color, that is a portion where an image is not formed on the print media out of the print target image data, may be overwritten by the tint block data.

The combined image data is printed on the print media via binary processing (screen processing) of a printer.

Out of the combined image data, the portion comprised of only the tint block image is comprised of pixels having the maximum density grayscale value and the minimum grayscale value, so regardless what the threshold matrix of the screen processing is like, the grayscale is converted such that the density value of the portion having the maximum density "255" remains as this density value, and the portion having the minimum density "0" remains as density "0" even after screen processing. As a result, the tint block image generated in the tint block generation processing is printed on the print media.

EXAMPLES

The following is an example when the tint block image is generated using the latent image portion dither matrix 33 and the background portion dither matrices 34-1 and 34-2 shown in FIG. 6 and FIG. 7, and the tint block image of the copy is generated by simulation to allow the pixel dots of the tint block image of the original disappear at a predetermined ratio. In simulation, the image reproducing capability, which depends on the input resolution and output resolution of copying, has limitations, so a size of large dots (half tone dots) is decreased to a first ratio, and a size of small dots (half tone dots) is decreased to a ratio smaller than the first ratio, and the micro dots (pixel dots) disappear at a predetermined ratio.

FIG. 13 shows an original and a copy of the tint block image of this example. FIG. 14 are enlarged views of the original and the copy of the tint block image. In FIG. 13 and FIG. 14, a background portion dither matrix 34-1, to make the output density of the tint block image "normal", is selected, and corresponding to this, the tint block images 14 and 16 to be printed as the original are generated using the latent image portion dither matrix 33, setting the input grayscale value as 16, and the copies 18 and 20 thereof are generated by simulation. Therefore the screen ruling is 53 lpi in the latent image portion LI, and the screen ruling of the second dots D2 in the background portion is 61 lpi. The tint block image 14 and the copy thereof 18 are an image of the latent image "COPY" of Japanese character. The tint block image 16 and copy 20 thereof, on the other hand, are the latent image "COPY" on which a camouflage image CAM is overlaid. In FIG. 13, the originals 14 and 16, the partially enlarged views thereof 14X and 16X, copies thereof 18 and 20 and the partially enlarged views thereof 18X and 20X are shown.

As FIG. 13 shows, in the originals 14 and 16 of the tint block image, the output density of the latent image portion LI and the output density of the background portion BI are the same, and the concealment capability for the latent image "COPY" in the originals is maintained. In the copies 18 and 20 of the tint block image, on the other hand, the decrease of the output density of the latent image portion LI is limited, but the output density of the background portion BI is decreased considerably.

In FIG. 14, the enlarged views 14X and 16X of the originals of the tint block are shown at the left, and the enlarged views 18X and 20X of the copies of the tint block are shown at the right. In the originals 14X and 16X, for the latent image portion LI the first dots D1, which are half tone dots having a size corresponding to the input grayscale value 16 based on the dot clustered dither matrix 33, are formed. The background portion BI, on the other hand, is comprised of large sized second dots D2 in a + shape and micro sized third dots D3 among the dots d2, where eight third dots D3 are fixed in the vertical, horizontal and diagonal directions from the second dots D2 respectively. As FIG. 7 shows, the second dot D2 is a cluster of five pixel dots, and the third dot is a one pixel dot.

As the enlarged views 18X and 20X of the copies at the right in FIG. 14 show, in the latent image portion LI, each first dot D1 may lose only one or two pixel dots, and the output density does not drop very much. Whereas in the background portion BI, each second dot D2 loses 2 or 3 pixel dots, and a considerable number of third dots D3 are lost. As a result, the output density of the background portion BI drops considerably in the copy. Therefore in the copy, a major difference is generated in the output density between the latent image portion LI and the background portion BI, and the identification capability for the latent image "COPY" increases.

Figure 15:
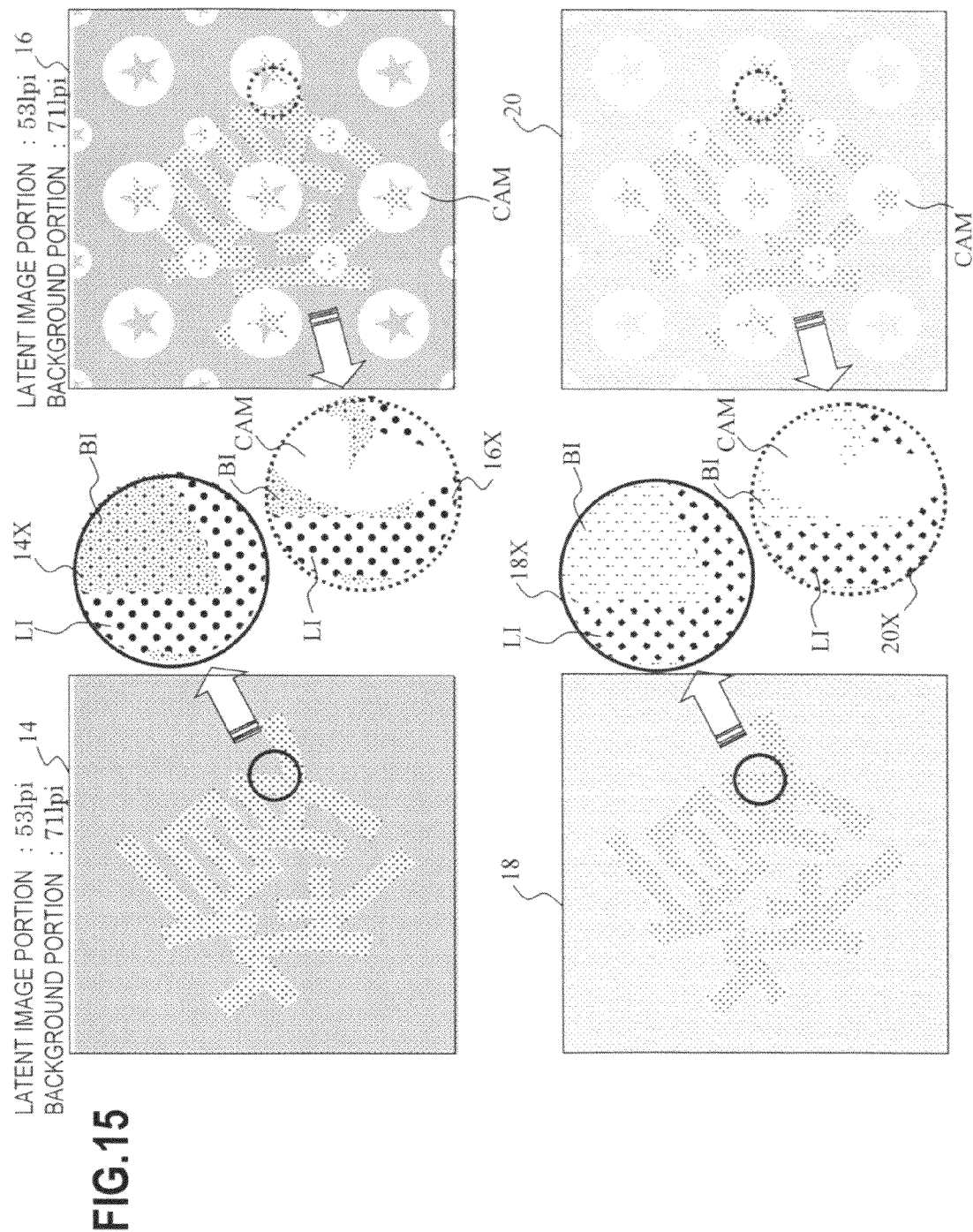
FIG. 15 shows an original and a copy of a tint block image according to an example.
Figure 16:
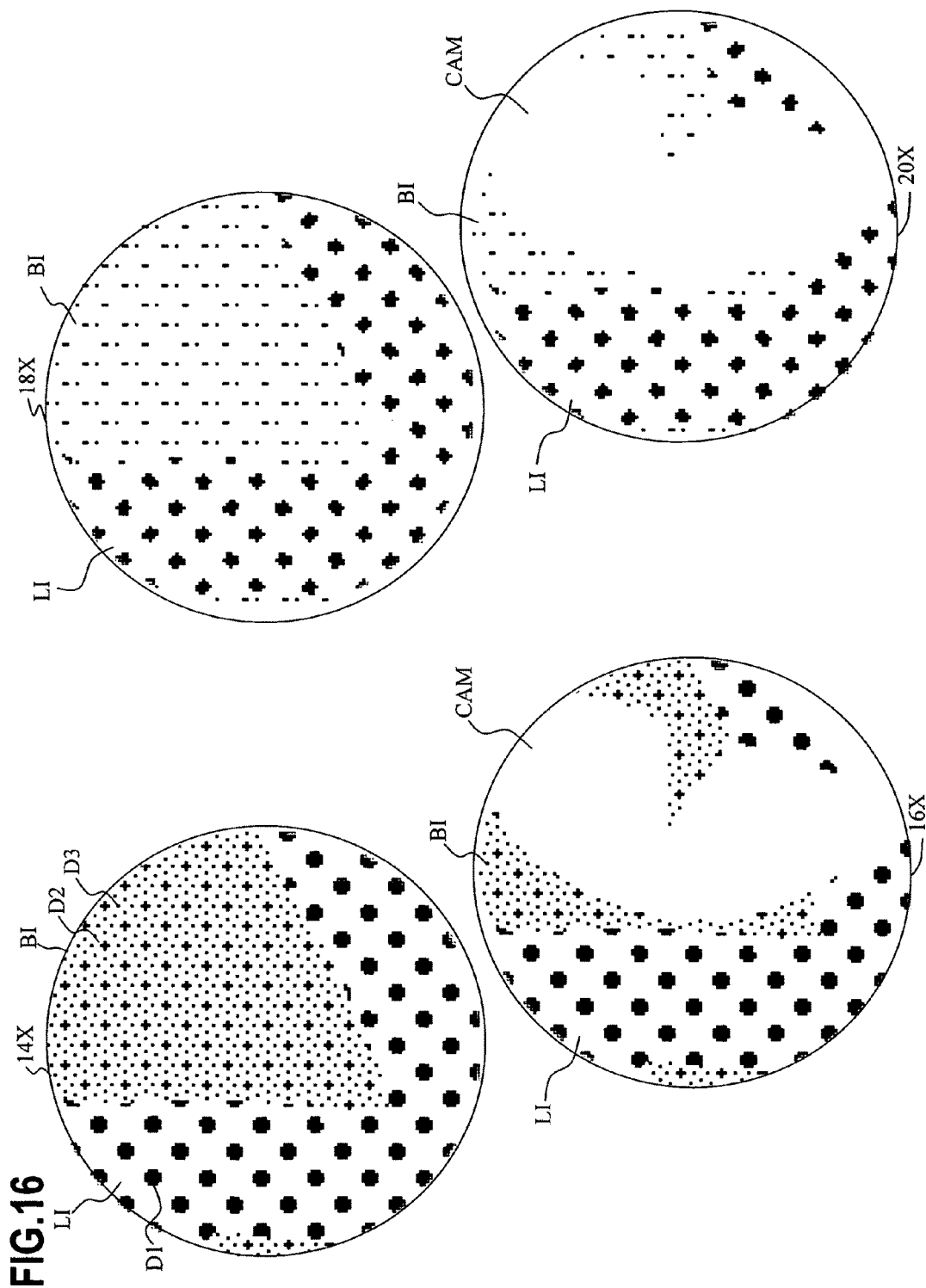
FIG. 16 are enlarged views of the original and the copy of the tint block image in FIG. 15.

FIG. 15 shows the originals and copies of the tint block image according to this example. FIG. 16 are enlarged views of the originals and copies of the tint block image. In FIG. 15 and FIG. 16, the background portion dither matrix 34-2, to make the output density of the tint block image "high", is selected, and the input grayscale value is set to 22 corresponding to this output density, the tint block images 14 and 16 of the originals are generated using the latent image portion dither matrix 33, and the copies 18 and 20 thereof are generated by simulation. Therefore the screen ruling of the latent image portion LI is 53 lpi, and the screen ruling of the second dots D2 of the background portion is 71 lpi. Just like the case of FIG. 13 and FIG. 14, the tint block image 14 and the copy 18 thereof show the latent image "COPY", and the tint block image 16 and the copy 20 thereof are the latent image "COPY" on which the camouflage image CAM is overlaid. 14X, 16X, 18X and 20X are partially enlarged views respectively.

In FIG. 15, just like FIG. 13, the output density of the latent image portion LI and the output density of the background portion BI are the same in the originals 14 and 16, where the concealment capability for the latent image "COPY" is maintained. In the copies 18 and 20, on the other hand, the output density of the latent image portion LI does not drop very much, but the output density of the background portion BI drops considerably, and the output density of the latent image LI is higher than FIG. 13, therefore the identification capability for the latent image in the copy is even higher.

Comparison of the enlarged views in FIG. 16 with FIG. 14 is as follows. The input grayscale value is high, 22, so the size of the first dots D1 in the latent image portion LI is large in the originals 14X and 16X. And the screen ruling of the second dots D2 in the background portion BI is high in the originals 14X and 16X, so the density is high. It is the same as FIG. 14 in that the third dots D3 are arranged at eight fixed positions in the vertical, horizontal and diagonal directions of the second dots D2.

In the copies 18X and 20X, each first dot D1 may lose only one or two pixel dots in the latent image portion LI, and the output density drops little. Whereas in the background portion BI, each second dot D2 loses 2 or 3 pixel dots, and a considerable number of third dots D3 are lost, more than FIG. 14. As a result, the output density of the background portion BI drops considerably in the copy. Therefore in the copy, a major difference is generated in the output density between the latent image portion LI and the background portion BI. The output density of the latent image portion LI in the copy is higher than FIG. 14, therefore the identification capability for the latent image "COPY" increases more accordingly.

As described above, according to the present embodiment, the background portion of the forgery inhibited tint block is comprised of large dots (second dots) with a predetermined screen ruling, which do not disappear very much during copying, and small dots (third dots) which easily disappear during copy. The screen ruling of the large dots in the background portion is set to a value close to the screen ruling of the latent image portion. For example, the screen ruling of the large dots in the background portion is greater than the screen ruling of the latent image portion and less than double the screen ruling of the latent image portion. The large dots and the small dots of the background portion are arranged at fixed positions so as not to influence each other. By this, the output density of the tint block image can be increased, and both high concealment capability for the latent image in the original and high identification capability for the latent image in the copy can be implemented.

In other words, in the background portion, the screen ruling of the large dots is decreased so that influence by the characteristics of the printer engine is decreased, and the generation of color unevenness in the background portion is prevented, and the screen ruling of the background portion and the screen ruling of the latent image portion are set to be similar, so that the difference in hue and saturation between the background portion and the latent image portion are prevented, and the concealment capability for the latent image in the original can be increased. Also by creating small dots in the background portion, the drop in output density during copying is increased, so as to increase the identification capability for the latent image in the copy. Since the output density of the entire tint block image can be increased, the identification capability for the latent image in the copy can be further increased.

What is claimed is:

1. A non-transitory computer-readable medium which stores a tint block image generation program for generating tint block image data which forms a tint block image including a latent image portion, which is reproduced during copying, and a background portion, of which output density drops during copying, on a print medium, the program causing a computer to execute:
a latent image portion generation step of generating data of a plurality of first dots having a first screen ruling in the latent image portion; and
a background portion generation step of generating data of a plurality of second dots having a second screen ruling, and data of a plurality of third dots which are dispersed among the second dots and of which size is smaller than that of the second dots, in the background portion.

2. A non-transitory computer-readable medium which stores the tint block image generation program according to claim 1, wherein the latent image portion generation step generates the data of the plurality of first dots having the first screen ruling based on a dot clustered screen, and the second screen ruling has the number of lines equivalent to the first screen ruling.

3. A non-transitory computer-readable medium which stores the tint block image generation program according to claim 1, wherein the second screen ruling is greater than the first screen ruling and less than double the first screen ruling.

4. A non-transitory computer-readable medium which stores the tint block image generation program according to claim 1, the program further causing the computer to execute a density setting step of, in responding to a density selling input for a tint block image, selecting the second screen ruling corresponding to the density setting input, and wherein
the latent image portion generation step generates data of the first dots, of which size corresponds to the second screen ruling selected in the density setting step based on a dot clustered screen.

5. A non-transitory computer-readable medium which stores the tint block image generation program according to claim 1, wherein the background portion generation step generates background portion dot image data in which the plurality of second dots and the plurality of third dots are placed at fixed positions in the background portion, and uses dot image data having a second screen ruling selected corresponding to a density setting input for the tint block image as the background portion dot image data, out of a plurality of types of dot image data having a plurality of second screen rulings respectively.

6. A non-transitory computer-readable medium which stores the tint block image generation program according to claim 5, wherein the latent image portion generation step generates the data of the first dots having a size which allows to reproduce the same output density as the dot image having the selected second screen ruling, based on a dot clustered screen.

7. A tint block image generation device for generating a tint block image including a latent image portion, which is reproduced during copying, and a background portion, of which output density drops during copying, on a print medium, comprising:
a latent image portion generation unit which generates a plurality of first dots having a first screen ruling in the latent image portion; and
a background portion generation unit which generates a plurality of second dots having a second screen ruling, and a plurality of third dots which are dispersed among the second dots and of which size is smaller than that of the second dots, in the background portion.

8. The tint block image generation device according to claim 7, wherein the latent image portion generation unit generates the plurality of first dots having the first screen ruling based on a dot clustered screen, and the second screen ruling is greater than the first screen ruling and less than double the first screen ruling.

9. The tint block image generation device according to claim 7, further comprising a density setting unit which in response to a density setting input for a tint block image, selects the second screen ruling corresponding to the density setting input, wherein
the latent image portion generation unit generates the first dots, of which size corresponds to the second screen ruling selected by the density setting unit, based on a dot clustered screen.

10. The tint block image generation device according to claim 7, wherein the background portion generation unit generates a background portion dot image in which the plurality of second dots and the plurality of third dots are placed at fixed positions in the background portion, and uses a dot image having a second screen ruling selected corresponding to the density setting input for the tint block image as the background portion dot image, out of a plurality of types of dot images having a plurality of second screen rulings respectively.

11. The tint block image generation device according to claim 10, wherein the latent image portion generation unit generates the first dots having a size which allows to reproduce the same output density as the dot image having the selected second screen ruling, based on a dot clustered screen.

12. A non-transitory computer-readable medium which stores a tint block image generation program for generating tint block image data which forms a tint block image including a latent image portion, which is reproduced during copying, and a background portion, of which output density drops during copying, on a print medium, the program causing a computer to execute:
a latent image portion generation step of generating data of a plurality of first dots in the latent image portion; and
a background portion generation step of generating data of a plurality of second dots, and data of a plurality of third dots which are dispersed at fixed positions among the second dots and of which size is smaller than that of the second dots, in the background portion.

13. A non-transitory computer-readable medium which stores the tint block image generation program according to claim 12, wherein
the plurality of second dots have a second screen ruling, and
the background portion generation step generates dot image data of the background portion made up of the second and third dots, and uses dot image data having a second screen ruling selected corresponding to a density setting input for the tint block image, out of a plurality of types of dot image data having a plurality of second screen rulings respectively.

14. A non-transitory computer-readable medium which stores the tint block image generation program according to claim 13, wherein the latent image portion generation step generates the data of the first dots having a size corresponding to the selected second screen ruling, based on a dot clustered screen.

15. A tint block image generation device for generating a tint block image including a latent image portion, which is reproduced during copying, and a background portion, of which output density drops during copying, on a print medium, comprising:
- a latent image portion generation unit which generates a plurality of first dots in the latent image portion; and
- a background portion generation unit which generates a plurality of second dots and a plurality of third dots which are dispersed in fixed positions among the second dots and of which size is smaller than that of the second dots, in the background portion.

16. The tint block image generation device according to claim 15, wherein
   the plurality of second dots have a second screen ruling, and
   the background portion generation unit uses a dot image having a second screen ruling selected corresponding to a density setting input for the tint block image, out of a plurality of types of dot images having a plurality of second screen rulings respectively, as an dot image of the background portion made up of the second and third dots.

17. The tint block image generation device according to claim 16, wherein the latent image portion generation unit generates the first dots having a size corresponding to the selected second screen ruling, based on a dot clustered screen.

18. A non-transitory computer-readable medium which stores a tint block image generation program for generating tint block image data which forms a tint block image including a latent image portion and a background portion of which output density drops more than that of the latent image portion during copying, on a print medium,
   the program causing a computer to execute:
   - a latent image portion generation step of generating latent image data for forming a latent image, which has a plurality of first dots, and which has a predetermined output density, in the latent image portion; and
   - a background portion generation step of generating, background image data for forming a background image in the background portion wherein the background image has a plurality of second dots and a plurality of third dots, which are dispersed among the second dots, and of which size is smaller than that of the second dots, and the background image has a predetermined output density.

19. A non-transitory computer-readable medium which stores the tint block image generation program according to claim 18, causing the computer to further execute a density setting step of, in responding to a density setting input for a tint block image, setting a density setting value, wherein
   in the latent image portion generation step, out of first and second latent images having a first output density and a second output density, which is greater than the first output density respectively, the first or second latent image having the first or second output density, whichever corresponds to the density setting value, is selected, and
   in the background portion generation step, out of first and second background images having a third and fourth output density corresponding to the first and second output density respectively, the first or second background image having the third or fourth output density, whichever corresponds to the density setting value, is selected.

20. A tint block image generation device for forming a tint block image including a latent image portion and a background portion of which output density drops more than that of the latent image portion during copying, on a print medium, comprising:
   - a latent image portion generation unit, which generates a latent image which has a plurality of first dots and has a predetermined output density, in the latent image portion; and
   - a background portion generation unit, which generates, in the background portion, a background image which has a plurality of second dots and a plurality of third dots which are dispersed among the second dots and of which size is smaller than that of the second dots, the background image having a predetermined output density.

21. The tint block image generation device according to claim 20, further comprising a density setting unit, which in response to a density setting input for a tint block image sets a density setting value, wherein
   out of first and second latest images having a first output density and a second output density, which is greater than the first output density, respectively, the latent image portion generation unit selects the first or second latent image having the first or second output density, whichever corresponds to the density setting value, and generates the latent image, and
   out of first and second background images having a third and fourth output density corresponding to the first and second output densities respectively, the background portion generation unit selects a first or second background image having a third or fourth output density, whichever corresponds to the density setting value, and generates the background image.

* * * * *